US008144984B2

(12) United States Patent
Sawada et al.

(10) Patent No.: US 8,144,984 B2
(45) Date of Patent: Mar. 27, 2012

(54) IMAGE PROCESSING APPARATUS, IMAGE PROCESSING METHOD, AND PROGRAM FOR COLOR FRINGING ESTIMATION AND COMPENSATION

(75) Inventors: Yasuhiro Sawada, Tokyo (JP); Satoru Komatsu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/947,297

(22) Filed: Nov. 29, 2007

(65) Prior Publication Data

US 2008/0137947 A1 Jun. 12, 2008

(30) Foreign Application Priority Data

Dec. 8, 2006 (JP) ................................. 2006-332610
Dec. 8, 2006 (JP) ................................. 2006-332611

(51) Int. Cl.
*G06K 9/00* (2006.01)
*G03F 3/08* (2006.01)
(52) U.S. Cl. ........................................ 382/167; 358/520
(58) Field of Classification Search .................. 382/167, 382/274, 275; 358/518–521
See application file for complete search history.

(56) References Cited

U.S. PATENT DOCUMENTS

| 5,457,477 | A | 10/1995 | Wang et al. | |
|---|---|---|---|---|
| 6,724,702 | B2 | 4/2004 | Taguchi et al. | |
| 7,751,642 | B1 * | 7/2010 | Persson | 382/266 |
| 2002/0140828 | A1 * | 10/2002 | Fukui et al. | 348/222.1 |
| 2005/0200733 | A1 * | 9/2005 | Malvar | 348/272 |
| 2006/0044428 | A1 * | 3/2006 | Tanaka | 348/272 |
| 2006/0098253 | A1 | 5/2006 | Masuno et al. | |
| 2006/0115174 | A1 | 6/2006 | Lim et al. | |
| 2006/0251322 | A1 * | 11/2006 | Palum et al. | 382/167 |
| 2007/0097267 | A1 | 5/2007 | Sakurai et al. | |
| 2007/0116375 | A1 * | 5/2007 | Utsugi et al. | 382/264 |
| 2007/0153341 | A1 * | 7/2007 | Kang | 358/529 |

FOREIGN PATENT DOCUMENTS

| EP | 1528797 A | 5/2005 |
|---|---|---|
| JP | 2001-145117 | 5/2001 |
| JP | 2003-018407 | 1/2003 |
| JP | 2003-060983 A | 2/2003 |
| JP | 2004-120487 A | 4/2004 |
| JP | 2006-135745 A | 5/2006 |

OTHER PUBLICATIONS

Zhang et al. ("Spatial filtering method for fringe patterns based on gray gradient," Proc. SPIE vol. 6357, Oct. 24, 2006, pp. 63570E-1 to 63570E-5).*
E. Chang, S. Cheung, and D. Pan, "Color filter array recovery using a threshold-based variable number of gradients," Proc. SPIE, vol. 3650, pp. 36-43, Jan. 1999.
The above reference was cited in Jan. 16, 2012 Japanese Office Actions, a copies of which are enclosed without an English Translation, that issued in Japanese Patent Application Nos. 2006-332610 and 2006-332611.

* cited by examiner

*Primary Examiner* — Yubin Hung
(74) *Attorney, Agent, or Firm* — Cowan, Liebowitz & Latman, P.C.

(57) ABSTRACT

This invention more effectively suppresses color fringing in a color image by image processing. An image processing method includes estimating the degree of color fringing in a color image based on the color image that is generated by photo-electrically converting an object image and formed from a plurality of color planes. The method also includes removing from the color image the estimated degree of color fringing.

1 Claim, 22 Drawing Sheets

FIG. 9A

| 0 | 0 | 0 | 1 | 2 | 3 |
|---|---|---|---|---|---|
| 0 | 0 | 1 | $\sqrt{2}$ | $\sqrt{5}$ | $\sqrt{10}$ |
| 0 | 0 | 1 | 2 | $\sqrt{8}$ | $\sqrt{13}$ |
| 0 | 1 | $\sqrt{2}$ | $\sqrt{5}$ | $\sqrt{10}$ | $\sqrt{17}$ |
| 1 | $\sqrt{2}$ | $\sqrt{5}$ | $\sqrt{8}$ | $\sqrt{13}$ | $\sqrt{20}$ |
| 2 | $\sqrt{5}$ | $\sqrt{8}$ | $\sqrt{13}$ | $\sqrt{18}$ | 5 |

FIG. 9B

| $\sqrt{5}$ | $\sqrt{2}$ | 1 | 0 | 0 | 0 |
|---|---|---|---|---|---|
| 2 | 1 | 0 | 0 | 0 | 0 |
| $\sqrt{2}$ | 1 | 0 | 0 | 0 | 0 |
| 1 | 0 | 0 | 0 | 0 | 0 |
| 0 | 0 | 0 | 0 | 0 | 0 |
| 0 | 0 | 0 | 0 | 0 | 0 |

F I G. 16
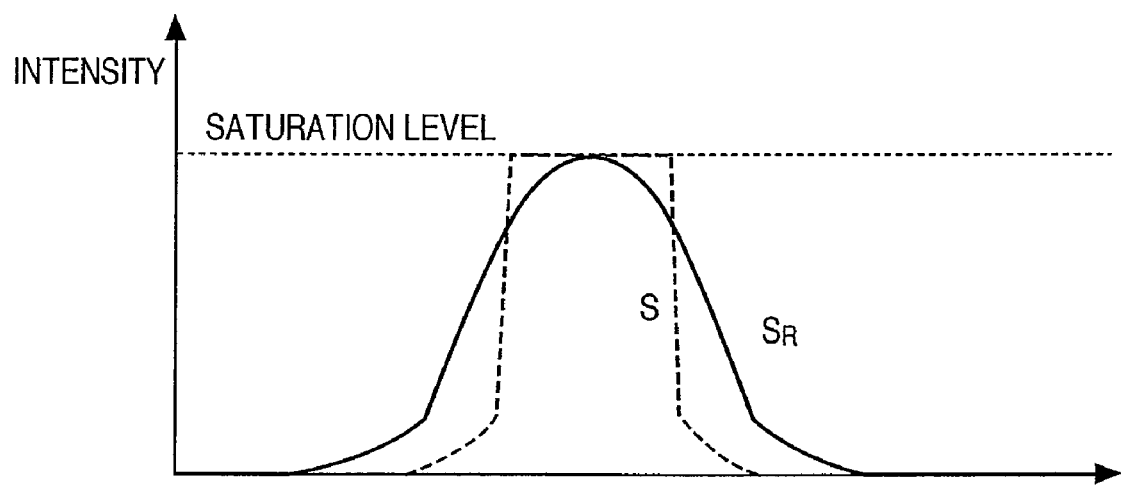

IMAGE PROCESSING APPARATUS, IMAGE PROCESSING METHOD, AND PROGRAM FOR COLOR FRINGING ESTIMATION AND COMPENSATION

BACKGROUND OF THE INVENTION

1. Field of the Invention

The present invention relates to a technique of reducing color fringing of a color shot image.

2. Description of the Related Art

In a color image capturing system, a color which does not originally exist appears as color fringing around a bright portion on an image owing to chromatic aberration of an imaging optical system. Color fringing readily occurs at a portion apart from the center wavelength of the imaging optical system. In a visible light color image capturing system, an artifact in blue, red, or purple as a mixture of blue and red appears as a fringe. This artifact is called color fringing or purple fringing.

Chromatic aberration can be optically suppressed to a certain degree by combining lenses having different dispersions.

These days, as digital cameras are becoming compact, demands arise for increasing the resolution of the image sensor and downsizing the optical system. It becomes difficult to satisfactorily suppress chromatic aberration by only the optical system. Artifacts need to be reduced by image processing.

Chromatic aberrations are roughly classified into transverse chromatic aberration (chromatic aberration of magnification) and longitudinal chromatic aberration (on-axis chromatic aberration). Transverse chromatic aberration is a phenomenon that the image location shifts in a direction along the image plane depending on the wavelength, as shown in FIG. 1. Longitudinal chromatic aberration is a phenomenon that the image location shifts in a direction along the optical axis depending on the wavelength, as shown in FIG. 2.

A digital image capturing system for the primary color system can correct transverse chromatic aberration by geometric transform of adding different distortions to the R (Red), G (Green), and B (Blue) color planes, as disclosed in U.S. Pat. No. 6,724,702B1.

As for longitudinal chromatic aberration, for example, an image which is in focus on the G (Green) plane serving as the center wavelength of the visible light region blurs on the R (Red) and B (Blue) planes serving as the ends of the visible light region. Longitudinal chromatic aberration cannot be corrected by geometric transform, unlike transverse chromatic aberration. Hence, there is proposed a method of correcting longitudinal chromatic aberration by adding different edge enhancement processes to the R, G, and B planes, as disclosed in Japanese Patent Laid-Open No. 2003-018407. Further, there is proposed a method of making longitudinal chromatic aberration less conspicuous by decreasing chroma in a region where color fringing occurs, as disclosed in Japanese Patent Laid-Open No. 2001-145117.

However, deconvolution and approximate edge enhancement processing as described in Japanese Patent Laid-Open No. 2003-018407 cannot obtain a proper result unless an accurate point spread function is known. In an image capturing apparatus such as a camera in which the object distance and shooting conditions change, the state of the optical system including the zoom position, F-number, and focus position also changes. It is difficult to obtain an accurate point spread function. Deconvolution can be used in only the linear reaction boundary of the image sensor, and cannot reduce color fringing around saturated pixels.

The optical system of a general color image capturing apparatus optically corrects chromatic aberration to a certain degree, and color fringing hardly stands out in a normal brightness range. Instead, when an excessively bright object exists within the frame to saturate pixels, a small quantity of leakage light which cannot be completely corrected often acts as a significant quantity and causes color fringing. That is, the technique described in Japanese Patent Laid-Open No. 2003-018407 cannot correct this color fringing.

As described in Japanese Patent Laid-Open No. 2001-145117, the process to decrease chroma can cancel a fringing color and reduce unnaturalness. However, the original object color is also influenced by this process and becomes grayish regardless of the presence/absence of color fringing.

SUMMARY OF THE INVENTION

It is desirable to overcome the conventional drawbacks, and to more effectively suppress color fringing in a color image by image processing.

According to a first aspect of the present invention there is provided an image processing apparatus, for processing original image data representing a captured color image that has been subjected to photoelectric conversion, comprising estimation unit which generates estimated color fringing information representing an estimate of color fringing in the captured image on the basis of the original image data, and removing unit which employs the estimated color fringing information to generate modified image data based on the original image data so as to compensate for such color fringing in at least a part of the captured image.

According to a second aspect of the present invention there is provided a method of processing original image data representing a captured color image that has been subjected to photoelectric conversion, the method comprising the steps of generating estimated color fringing information representing an estimate of color fringing in the captured color image on the basis of the original image data, and employing the estimated color fringing information to generate modified image data based on the original image data so as to compensate for such color fringing in at least a part of the captured image.

Further features of the present invention will become apparent from the following description of exemplary embodiments with reference to the attached drawings.

BRIEF DESCRIPTION OF THE DRAWINGS

FIG. 9A is a view showing a distance from a saturated pixel to a peripheral pixel;

FIG. 9B is a view showing a distance from a peripheral pixel to a saturated pixel;

FIG. 16 is a graph showing a convolution result;

DESCRIPTION OF THE EMBODIMENTS

Figure 1:
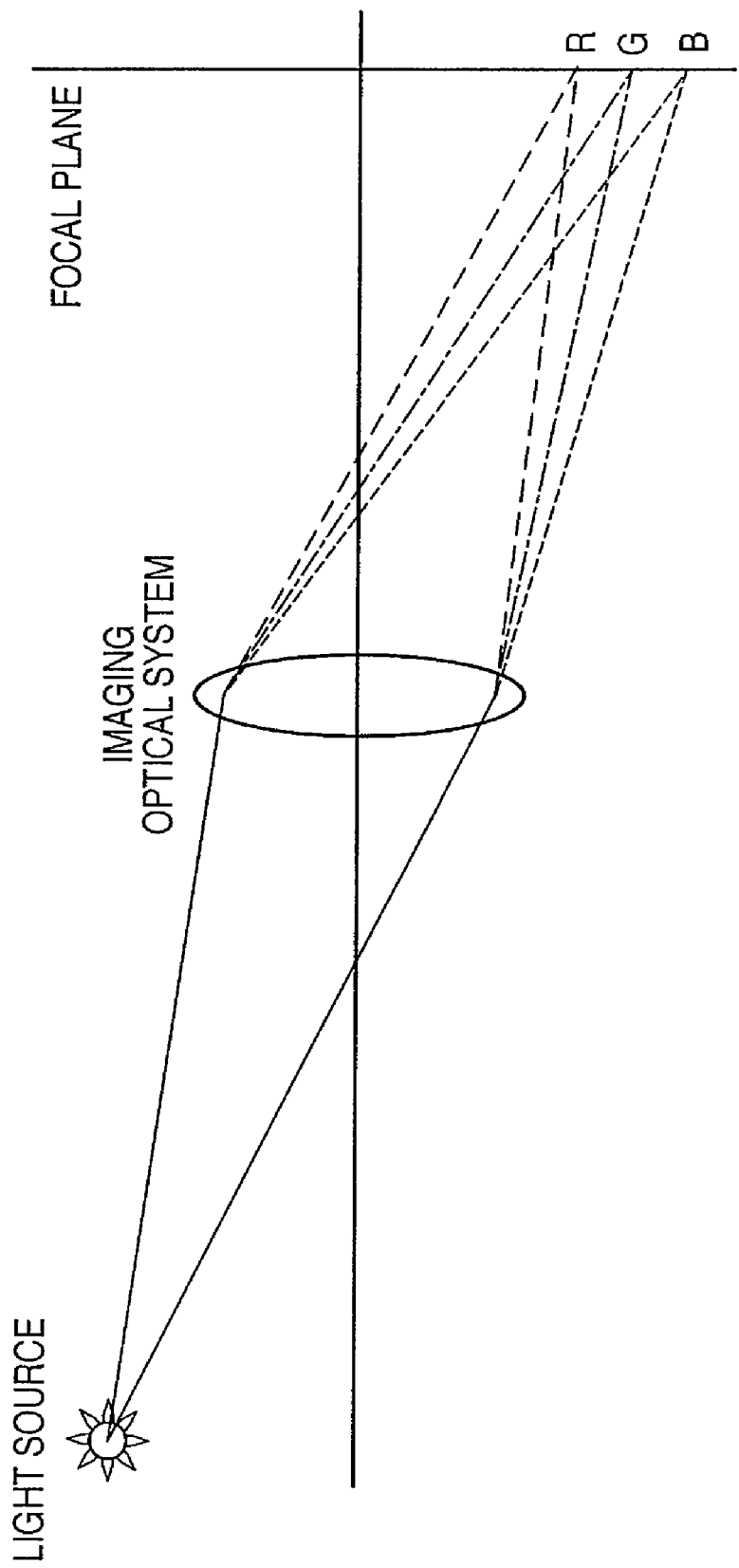
FIG. 1 is a view showing a transverse chromatic aberration generation principle.

Preferred embodiments of the present invention will be described below.

First, an outline of the embodiments of the present invention will be explained.

Embodiments of the present invention can provide an image processing apparatus, method, and program capable of effectively removing color fringing around saturated pixels of a color image which is shot by a color image capturing apparatus and suffers color fringing, and reproducing the original color.

The image processing apparatus according to one embodiment of the present invention comprises an estimation unit which estimates the degree of color fringing from image data representing a color image that is shot by the image capturing system and made up of a plurality of color planes, and a removing unit which generates modified image data representing a color image corresponding to the original image but with reduced color fringing. For example, the removing unit may generate the modified image data for a pixel by subtracting the estimated amount from the original image data for the pixel concerned. Of course, instead of subtraction, any other suitable kind of operation can be performed to generate the modified image data from the original image data using information about the color fringing estimated by the estimation unit. For example, it would be possible to multiply the original image data for a pixel by a correction factor dependent on the estimated color fringing information. Preferably, the removing unit sets, as a removal target, a color plane exhibiting the intensity of a wavelength range where chromatic aberration remains in the imaging optical system used in image shooting. The removing unit subtracts the degree of fringing on the target color plane.

The image processing apparatus according to one embodiment of the present invention further comprises a region determination unit, and the estimation unit can also employ different estimation methods depending on the type determined by the region determination unit. The image processing apparatus preferably further comprises an excessive removal suppressing unit, and the excessive removal suppressing unit can also suppress change of the hue of a color image that is caused by the removing unit.

In some embodiments the color plane subjected to removal is the R (Red) or B (Blue) plane, but can also be a color difference plane U/V representing a color tincture corresponding to the R or B plane.

Since color fringing is a spatial action, it is preferable to provide a spatial calculation unit which executes spatial calculation in order to estimate the image intensity of color fringing from a color image. The spatial calculation can be applied not only to a color plane subjected to removal, but also to a color plane having high resolution as a reference plane. The reference plane is a color plane having a wavelength range or luminance at which chromatic aberration is satisfactorily corrected in the imaging optical system used in image shooting. The reference plane is generally the G (Green) or Y (luminance) plane. Several kinds of spatial calculation are conceivable. One of them is (1) image distance transform of calculating a distance to each pixel from a saturated region where fringing occurs. The saturated region is a saturated pixel on the reference plane or the color plane subjected to removal.

Alternatively, (2) convolution processing is used. In this case, prior to convolution, the image intensity of a reference plane undergoes non-linear conversion in order to correct non-linearity upon saturation. The intensity of the reference plane abruptly increases near a region where this intensity is saturated. The non-linear conversion can also be conversion into two values representing whether the intensity of the reference plane is saturated. The convolution processing is done for the image intensity having undergone the non-linear conversion.

The kernel of convolution processing preferably simulates a decrease in the resolution of the imaging optical system, and is, for example, the PSF (Point-Spread Function) of the imaging optical system at the typical wavelength of a color band corresponding to a plane subjected to removal. Since the PSF of the imaging optical system changes depending on the image location and the state of the optical system in shooting, the convolution kernel is desirably changed in accordance with these factors. However, it is also possible to adopt a kernel enveloping a plurality of PSFs of the imaging optical system that change in accordance with the image location and the state of the optical system in shooting.

The PSF also changes depending on the wavelength within even a single color band though this cannot be known. Thus, it is also possible to adopt a kernel enveloping PSFs which are different in accordance with a plurality of wavelengths within a color band corresponding to a plane subjected to removal. This kernel desirably decreases in accordance with the distance from the center. For a simple expression, it is practical to adopt an axially symmetrical kernel or define the kernel by an exponential function or Gaussian function.

As spatial calculation, (3) image intensity gradient calculation is also available. The image intensity gradient is the intensity gradient of the reference plane or the color plane subjected to removal.

When the spatial calculation unit executes (1) image distance transform, the estimation unit outputs, in a region where the color plane subjected to removal is saturated, a value which increases in a direction away from a region where the reference color plane is saturated. In a region where the color plane subjected to removal is not saturated, the estimation unit outputs a value which decreases in a direction away from a region where the color plane subjected to removal is saturated. The region determination unit switches the estimation method. These outputs increase as the difference between the saturation radii of the color plane subjected to removal and the reference color plane increases. The ratio of increase/decrease effectively changes in accordance with the image height and the state of the imaging optical system used to shoot an image.

When the spatial calculation unit executes (2) convolution processing or (3) image intensity gradient calculation, the estimation unit outputs a value depending on the convolution value or image intensity gradient. In this case, the estimation unit can simply output a value proportional to the convolution value or image intensity gradient.

The region determination unit preferably determines whether the color plane subjected to removal is saturated. Based on the determination, the region determination unit switches the estimation method of the estimation unit, selects one of estimated values obtained by the estimation unit, or interpolates estimated values obtained by the estimation unit.

In this manner, the estimated value of the fringing amount to be removed can be attained. However, this estimated value is not always accurate, and may be large or small. If the estimated value is small, color fringing cannot be completely removed and remains slightly. If the estimated value is large, color fringing is excessively removed and the hue of color fringing is inverted. According to experiments by the present inventors, the latter excessive removal results in a highly unnatural image in comparison with the former removal shortage. To suppress inversion of the hue, an excessive removal suppressing unit is preferably arranged to set only pixels in the color gamut of a predetermined region as removal targets of the removing unit, and/or restrict even the color gamut after the change to a predetermined region. These two predetermined regions may be the same. The color gamut and the predetermined region within it may be analysed by converting the image data in an original color coordinate system (e.g. an RGB system) into another color co-ordinate system (e.g. the Lab system or the LUV system), and then selecting only pixels in certain regions (e.g. quadrants) of that other color coordinate system. Alternatively, the part of the color plane subjected to removal can be set to a region where its intensity is higher than that of the reference color plane. As a method of suppressing change of the hue, change of the hue angle by the removing unit may also be suppressed to a predetermined angular range in a suitable color co-ordinate system.

The above-described image processing apparatus can provide an image in which color fringing is reduced.

A color image capturing apparatus having the image processing apparatus according to the embodiments of the present invention suffices to comprise an optical system which suppresses chromatic aberration in only a wavelength range corresponding to at least one color plane. The chromatic aberration restriction on the optical system can be eased for the remaining color planes.

Generally, an imaging optical system mounted in a color image capturing apparatus performs predetermined chromatic aberration correction based on the trade-off between the size, the cost, and various aberration corrections. The embodiments of the present invention can ease the restriction on chromatic aberration. As a result, the imaging optical system can achieve other aberration corrections, downsizing, and cost reduction at higher level.

Embodiments of the present invention will be described in detail below.

First Embodiment

An image processing method according to the first embodiment of the present invention will be described with reference to the accompanying drawings. The same reference numerals denote the same parts throughout the drawings.

Figure 3:
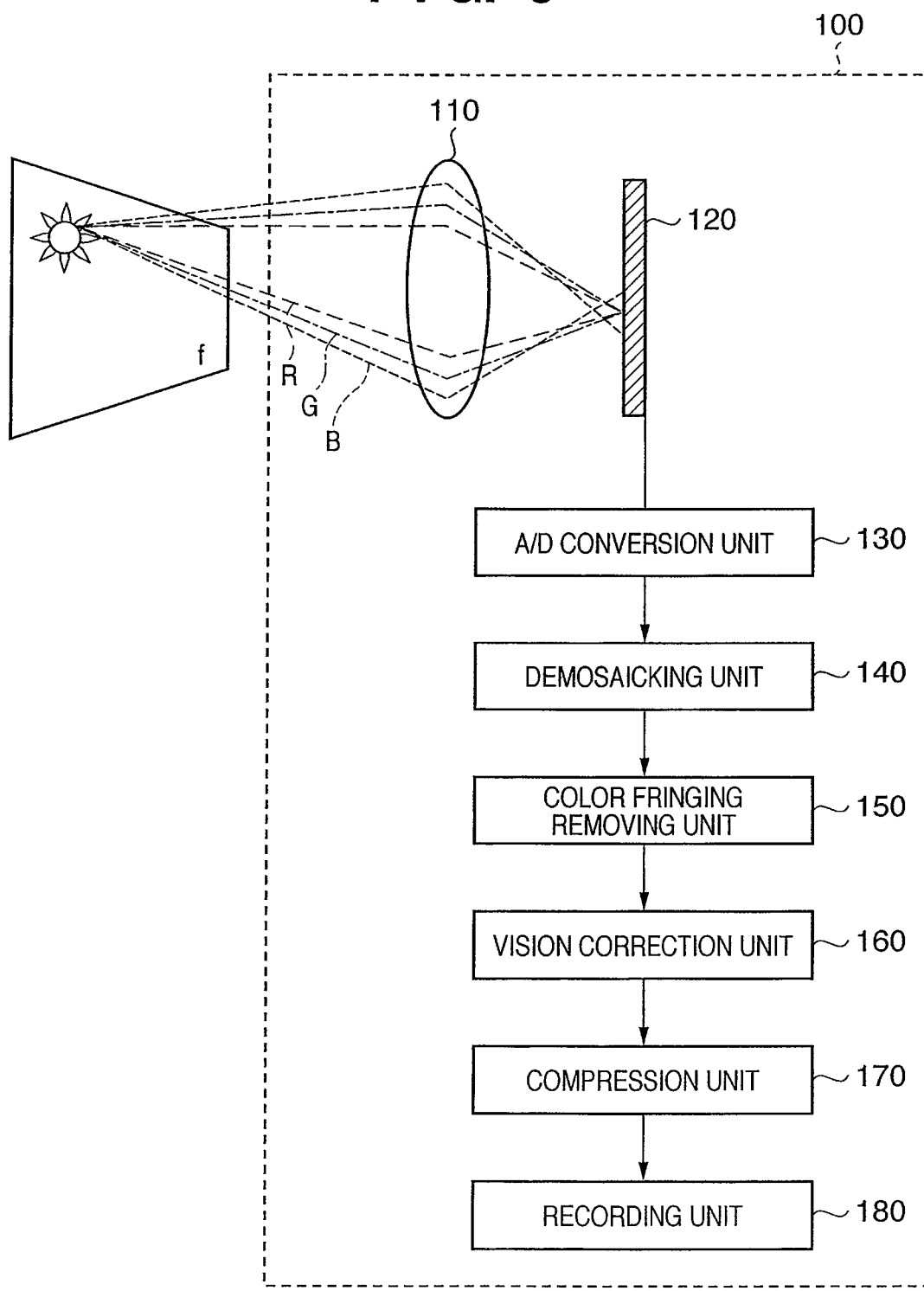
FIG. 3 is a view showing the arrangement of a color image capturing apparatus to which an image processing method according to the first embodiment is applicable.

FIG. 3 shows an example of a color image capturing apparatus 100 to which the image processing method according to the first embodiment is applicable.

Figure 2:
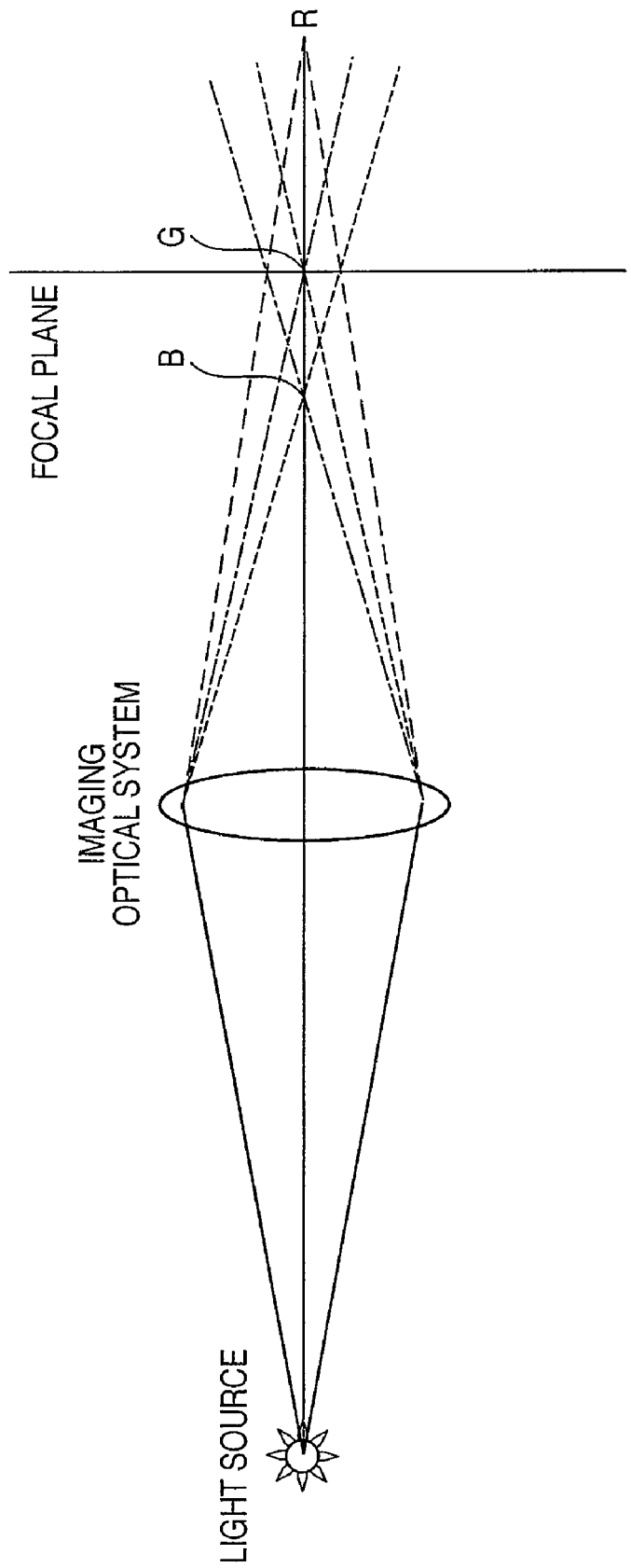
FIG. 2 is a view showing a longitudinal chromatic aberration generation principle.

The color image capturing apparatus 100 comprises an imaging optical system 110, image sensor 120, A/D conversion unit 130, demosaicking unit 140, color fringing removing unit 150, vision correction unit 160, compression unit 170, and recording unit 180. Note that a field (object) f, and R (Red), G (Green), and B (Blue) rays shown in FIG. 2 are not building components of the color image capturing apparatus 100, but are shown in FIG. 3 for descriptive convenience.

In FIG. 3, the field f is imaged via the imaging optical system 110 on the image sensor 120 which photo-electrically converts an object image. Generally, an imaging optical system mounted in a color image capturing apparatus performs predetermined chromatic aberration correction based on the trade-off between the size, the cost, and various aberration corrections. However, the imaging optical system 110 according to the first embodiment sufficiently corrects longitudinal chromatic aberration in only the R and G wavelength ranges, and longitudinal chromatic aberration remains in the B band. Since the trade-off restriction "longitudinal chromatic aberration in the B band" is excluded, other aberration corrections, downsizing, and cost reduction can be achieved at higher level.

Figure 4:
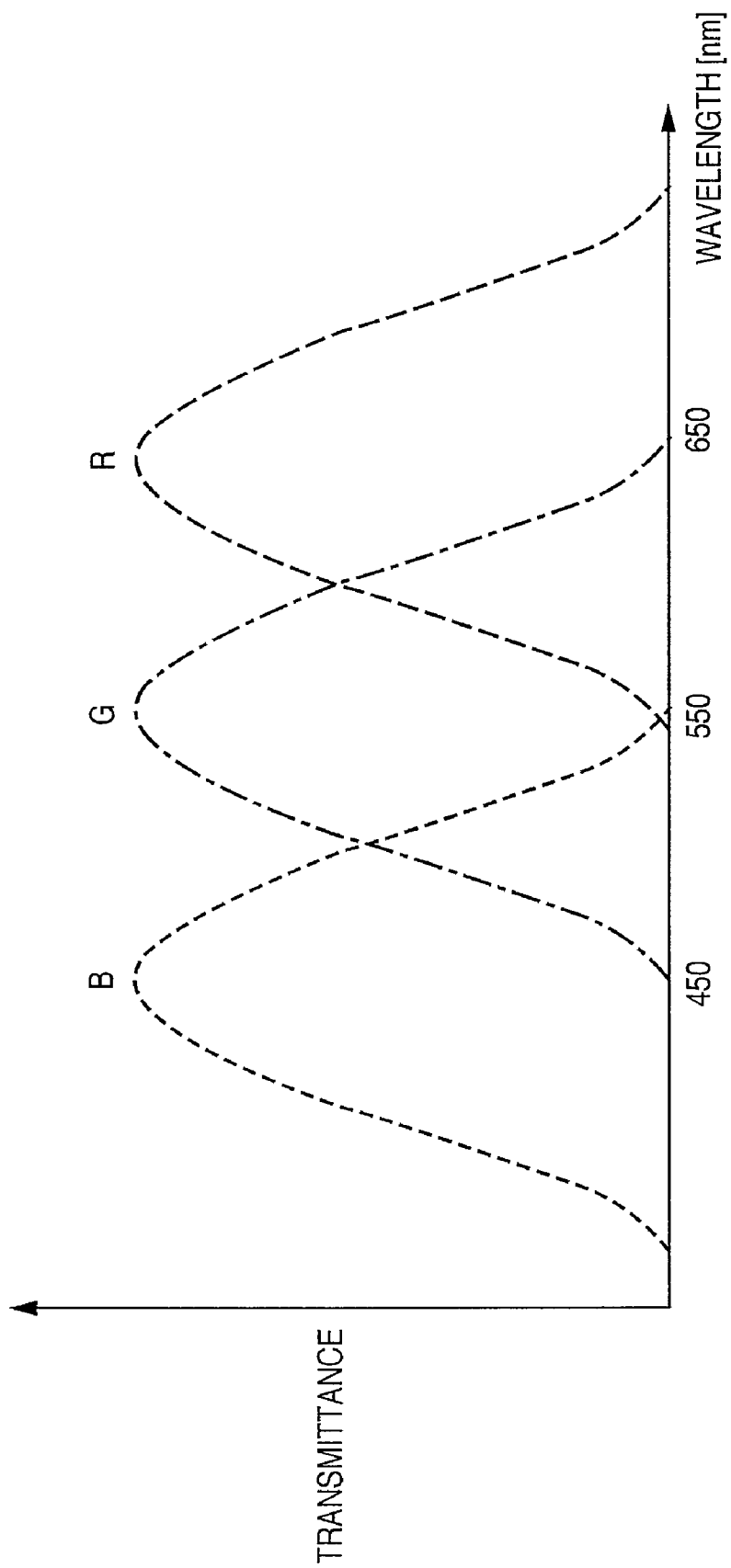
FIG. 4 is a graph showing the spectral transmittance of a primary color filter.
Figure 5:
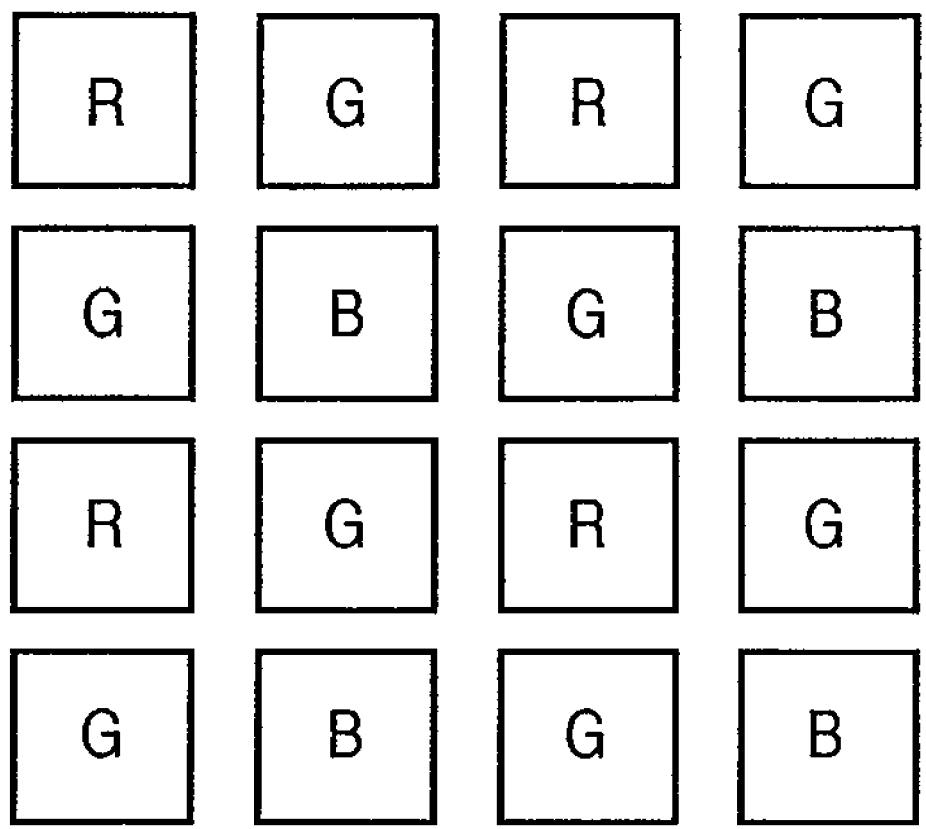
FIG. 5 is a view showing the layout of color elements of the primary color filter.

The image sensor 120 is a one-CCD color image sensor having a general primary color filter. As shown in FIG. 4, the primary color filter is made up of three types of color filters having dominant transmission wavebands around 650 nm, 550 nm, and 450 nm, respectively. These color filters sense color planes corresponding to the R (Red), G (Green), and B (Blue) bands. In the one-CCD color image sensor, the color filters are spatially arrayed for respective pixels as shown in FIG. 5, and each pixel can obtain only an intensity on a single color plane. For this reason, the image sensor outputs a color mosaic image.

The A/D conversion unit 130 converts a color mosaic image output as an analog voltage from the image sensor into digital data suited to subsequent image processing.

The demosaicking unit 140 interpolates a color mosaic image, generating a color image having information of the R, G, and B colors in all pixels. As the interpolation method, many methods are proposed including simple linear interpolation and a complicated method as described in "E. Chang, S. Cheung, and D. Pan, "Color filter array recovery using a threshold-based variable number of gradients," Proc. SPIE, vol. 3650, pp. 36-43, January 1999". However, the present invention does not limit the interpolation method.

Figure 6:
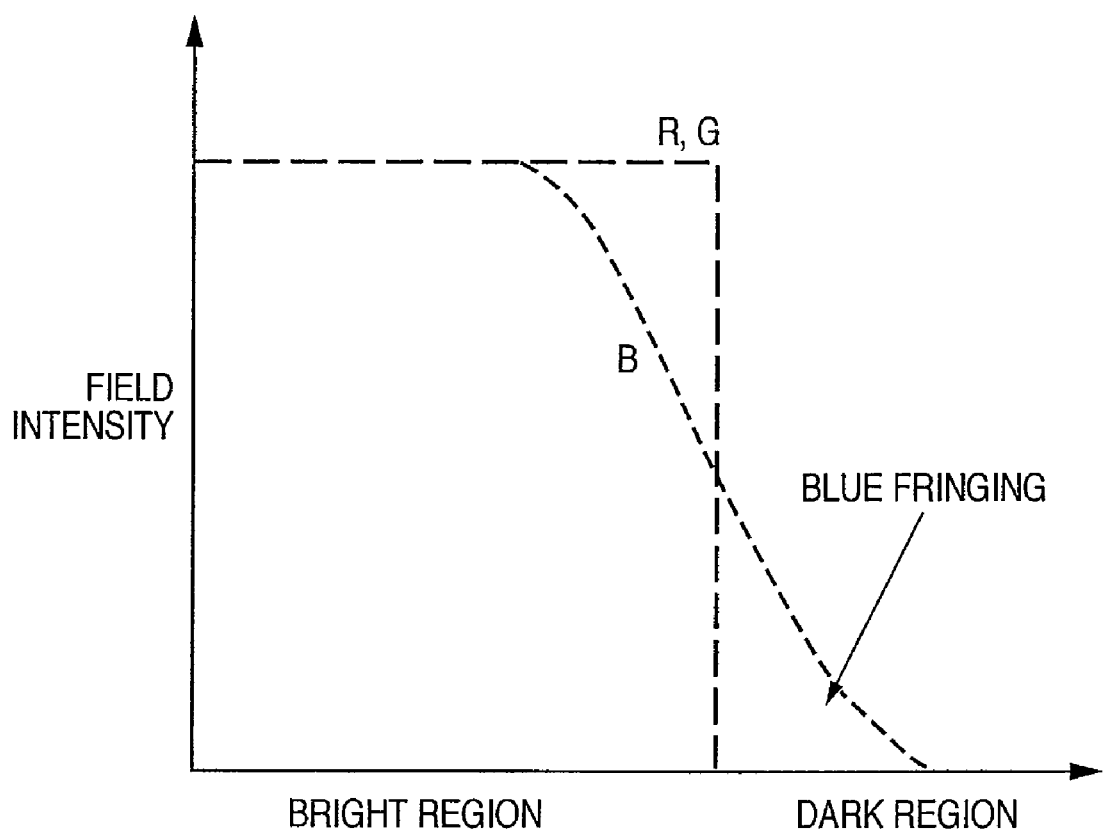
FIG. 6 is a graph showing blue fringing at the boundary between bright and dark regions.

The resolution of the B plane of the generated color image is lower than those of the R and G planes owing to chromatic aberration of the imaging optical system 110. At the boundary between bright and dark regions, blue blurs as shown in FIG. 6, and an artifact like a blue fringe appears around the bright region.

In the above description, the image sensor 120 has R, G, and B primary color filters. However, even complementary color filters can obtain a color image similarly made up of the R, G, and B color planes by color conversion processing.

The color fringing removing unit 150 removes the blue artifact from a color image by image processing. The image processing method according to the first embodiment is directed to this removing processing, which will be explained in detail later.

Then, the vision correction unit 160 executes processing. The vision correction unit 160 processes a color image in order to improve mainly the image appearance. For example, the vision correction unit 160 performs image corrections such as tone curve (gamma) correction, chroma enhancement, hue correction, and edge enhancement.

At the final stage of the processing, the compression unit 170 compresses a corrected color image by JPEG or the like to decrease the recording size.

In practice, the building components from the image sensor 120 to the recording unit 180 are not always separate devices. A single microprocessor may perform processes corresponding to a plurality of building components.

The recording unit 180 records a processed digital image signal on a recording medium such as a flash memory.

Figure 7:
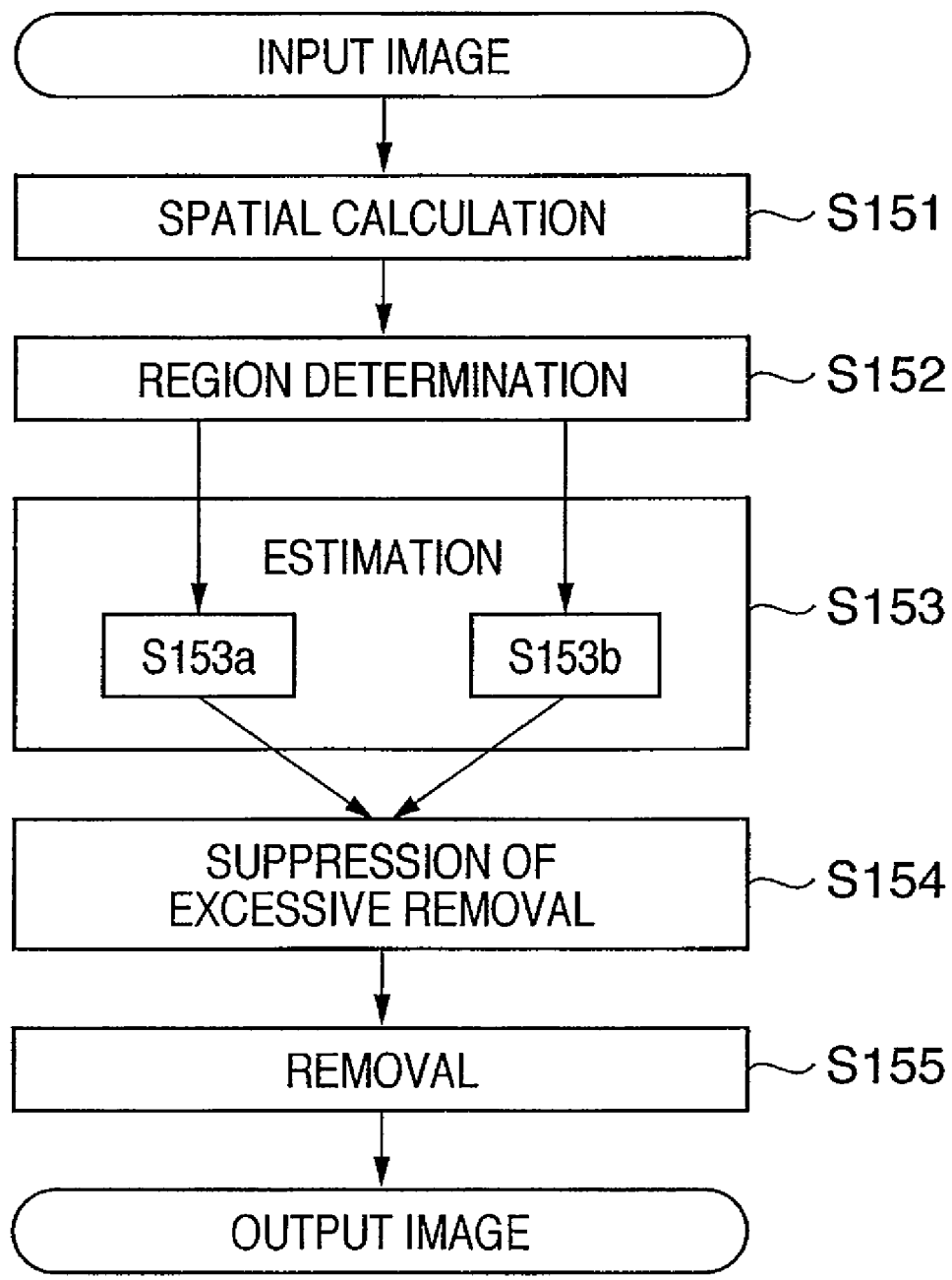
FIG. 7 is a flowchart showing a color fringing removing operation by image processing in the color image capturing apparatus according to the first embodiment.

FIG. 7 is a flowchart showing a color fringing removing operation by image processing in the color image capturing apparatus 100 having this arrangement. In this embodiment, the steps in the flowchart of FIG. 7 may be carried out by a processor of the apparatus 100, such as a CPU (not shown), which executes a program (not shown) stored in a memory (not shown) of the apparatus. The same is true for other embodiments described later.

As shown in FIG. 7, the process of the color fringing removing unit 150 includes spatial calculation step S151, region determination step S152, estimation step S153, excessive removal suppressing step S154, and removing step S155.

In the color fringing removing operation, the B plane is set as a removal target, and the G plane is used as a reference plane.

Figure 8:
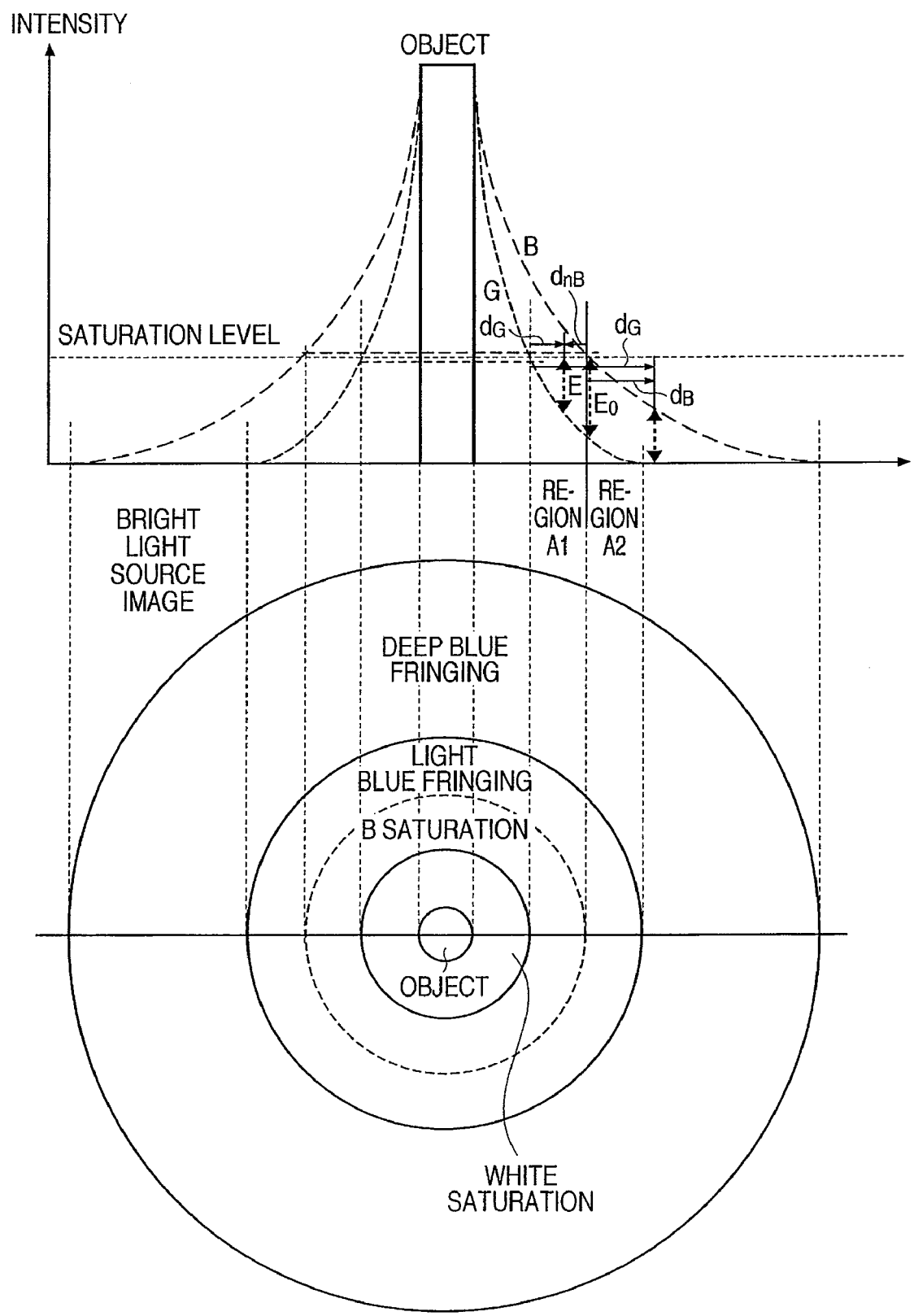
FIG. 8 is a graph showing the typical profiles of the B and G planes of a bright object.

FIG. 8 shows the typical profiles of the B and G planes of a bright object.

In FIG. 8, the abscissa axis represents a section on an image, and the ordinate axis represents the intensities of the B and G planes. In FIG. 8, a bright object exceeding the saturation brightness exists at the center. The bottom of the profile spreads at the periphery, which is not bright originally, of the bright object by light leaking from the bright object owing to aberration or flare. The degree of fringing depends on the brightness of the bright object, and decreases exponentially in a direction away from the bright object. Even the G plane suffers fringing, and its profile spreads to a certain degree though the spread is smaller than that of the B plane. An intensity at a predetermined saturation level or higher cannot be measured by the image sensor, and is rounded down. In a shot image, both the G and B planes are saturated at an intensity much higher than that of the original bright object, generating a white saturated region. Note that the R plane has the same profile as that of the G plane. After the saturation, the intensity of the G plane attenuates. However, since the saturation radius of the B plane is larger, the image intensity difference between the G and B planes becomes larger, and the saturated region becomes light bluish. When the B plane reaches its saturation radius, its intensity also starts attenuating, decreasing the image intensity difference between the G and B planes. After the G plane reaches the bottom of its profile, only the B plane has an intensity and the fringing becomes a deep blue.

In the object image, light blue fringing and deep blue fringing are recognized as unnatural blue fringing. If the degree of B fringing is almost equal to that of G fringing, the fringing is recognized as the color of a bright object and becomes natural. Such fringing is an effective image representation expressing the brightness of a bright object exceeding the saturation brightness.

From this, in spatial calculation step S151, a saturated pixel region where the intensities of both the G and B color planes are equal to or higher than a predetermined threshold is extracted. Distances $d_G$ and $d_B$ of pixels from the saturated pixel region are calculated as pixel widths. For example, assuming that hatched cells in FIG. 9A are saturated pixels, distances are represented by numerical values in the pixels.

The threshold is set to an output value at which the output value of the A/D conversion unit and the incident light intensity lose a proportional relationship. A state in which a pixel has a higher output value will be called saturation. Distance calculation is generally called image distance transform. This distance is not limited to an accurate Euclidean distance, but may also be a quasi-Euclidean distance, chessboard distance, or city block distance. By the image distance transform, a saturated pixel takes 0, and an unsaturated pixel takes a positive value. By the transform of the B plane, pixels are classified into a region A1 where B is saturated, and a region A2 where B is not saturated (see FIG. 8).

In this step, at least a distance $d_{nB}$ within the region A1 from a region A2 where B is not saturated is calculated in the same way. $d_B$ is represented as shown in FIG. 9A, whereas $d_{nB}$ is represented as shown in FIG. 9B. Note that $d_{nB}$ can also be represented as a negative value of $d_B$.

In region determination step S152, processing targets are distributed to a plurality of processing methods S153a and S153b in estimation step S153 in accordance with the calculation result. In the first embodiment, the region A1 where B is saturated is assigned to S153a, and the region A2 where B is not saturated is assigned to S153b.

In estimation step S153, the intensity of the extra B plane which generates color fringing is estimated for each pixel of the color image. The estimation method changes depending on whether B is saturated. Estimation calculation is executed in S153a and S153b, which correspond to the regions A1 and A2 in FIG. 8, respectively.

As described above, the image intensity of the B plane subjected to removal is the difference between the B and G planes. The estimated amount increases in the region A1 in a direction away from the region where G is saturated, and decreases in the region A2 in a direction away from the region A1.

The estimated amount depends on the brightness of a bright object, but cannot be obtained directly due to saturation. Instead, the first embodiment adopts the difference "$d_G - d_B$" or "$d_G + d_{nB}$" between the B and G saturation radii. In step S153a for the region A1, an estimated fringing amount E is calculated as the estimated amount by $$E = (k1(d_G + d_{nB}) + k0) \times d_G/(d_G + d_{nB})$$

In step S153b for the region A2, the estimated fringing amount E is calculated by $$E = (k1(d_G - d_B) + k0)\exp(-k2 d_B)$$

Then, the estimated fringing amounts E are transferred to excessive removal suppressing step S154. At this time, no Mach band appears because the estimated fringing amount E coincides with $E0 = (k1 d_g + k0)$ on the boundary between the regions A1 and A2.

k0, k1, and k2 are constants, and change depending on the imaging optical system and the pixel pitch of the image sensor. It is desirable to obtain values suitable for approximating the fringing amount from a shot image.

Strictly speaking, the characteristics of the imaging optical system change depending on the image height and states such as the zoom position, F-number, focus position, and lens interchange. It is also effective to change the constants k0, k1, and k2 in accordance with these factors. Considering the presence of the excessive removal suppressing step to be described below, it is desirable to set constants for estimating a fringing amount larger than a value suitable for approximating the fringing amount. Alternatively, considering the presence of the excessive removal suppressing step to be described below, it is also possible to set constants for estimating a large fringing amount so as to cope with change of the characteristic of the imaging optical system.

In excessive removal suppressing step S154, the estimated amount E is corrected to obtain an actual removal amount E'. The removal amount estimated in step S153 complies with a predetermined model, and does not coincide with an actual fringing amount. For example, even light detected on the B plane exhibits different fringes between light having a wavelength of 450 nm and that having a wavelength of 400 nm. However, this is not considered in step S153. If the removal amount is excessively small, the image remains slightly bluish even after removal. If the removal amount is excessively large, B is excessively removed against the gray background, and the image becomes yellowish green. In the latter case, the user feels that the image is unnatural. In this step, therefore, fringing removal is restricted within a predetermined hue range. For this purpose, the chromaticity of pixels is calculated first. For a given pixel, a device-dependent conversion is carried out to convert the intensities of the pixel in the RGB color space (R, G, and B planes) into intensities in the LAB color space, $$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix} \quad (1)$$

$$a = 5(x - y)$$

$$b = 2(y - 1)$$

where R is the image intensity of the pixel in the R color plane, G is the image intensity of the pixel in the G color plane, B is the image intensity of the pixel in the B color plane, x, y and z are color coordinates of the pixel in the CIE XYZ color space, a and b are co-ordinates of the pixel in color-opponent dimensions of the CIE LAB color space, and the matrix (0.41 . . . 0.95) is an exemplary conversion matrix dependent on the particular characteristics of the components of the imaging system. The values in the matrix can be changed according to the particular optical characteristics of the apparatus.

Figure 10:
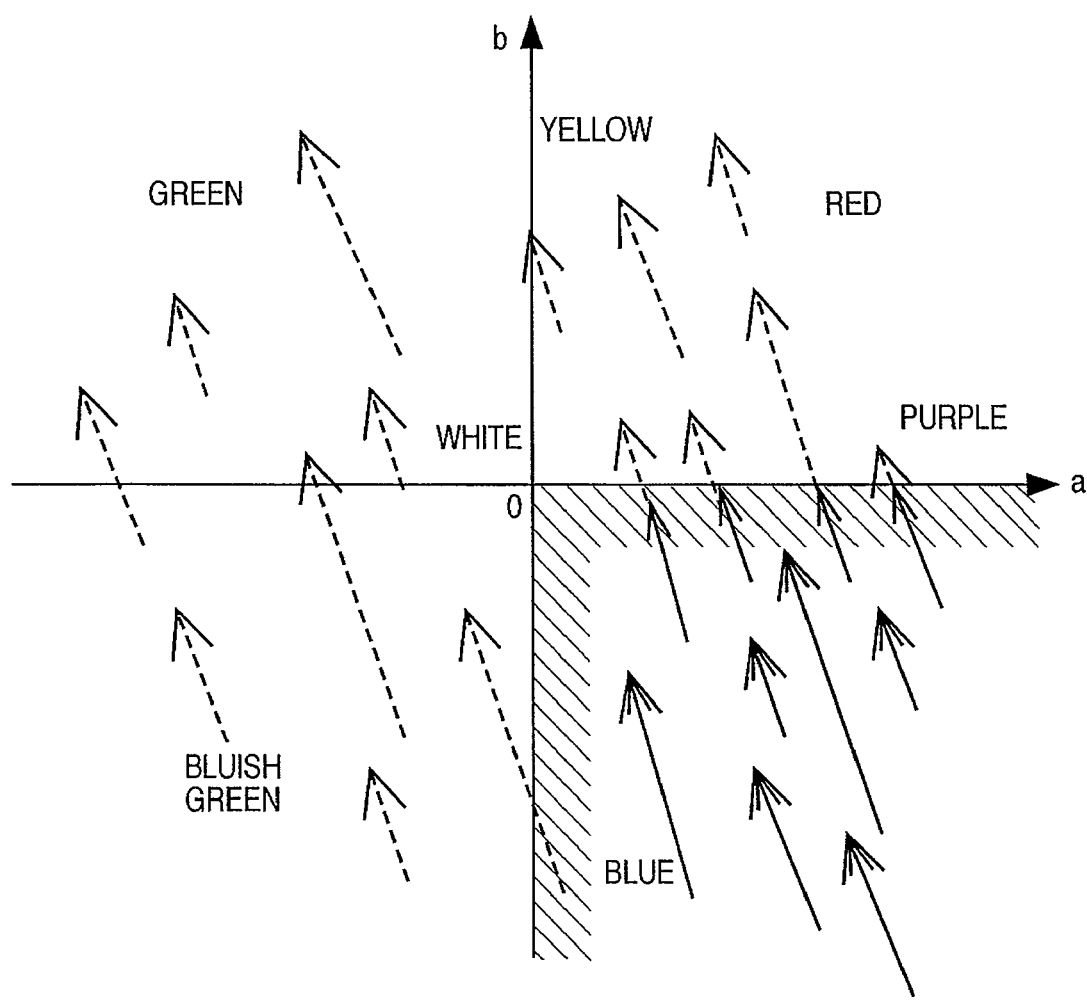
FIG. 10 is a graph showing chromaticity coordinates.

FIG. 10 shows the a-b plane of chromaticity coordinates. Blue falls within the fourth quadrant. When the estimated amount E is removed from the B intensity, the chromaticity moves to the upper left as indicated by dotted arrows. The start point of the arrow represents a chromaticity before removal, and its tip represents a chromaticity after removal. From this, the hue range where fringing is removed is restricted to a>0 and b<0.

Two conditions, B>0.22R+0.72G and B>−1.82R+3.54G, are used when setting a removal amount E' in this embodiment. In step S154, E'=0 for pixels which do not meet these conditions, and as a result these pixels are excluded from being removal targets. These pixels do not change in removing step S155, and their pixel values are not influenced by color fringing removing step S155. In other words, only pixels which meet at least one of the two conditions are removal targets.

The removal amount for pixels which meet these conditions is set to $$E' = \min(E, B - (0.22R + 0.72G), B - (-1.82R + 3.54G))$$

Then, E' is transferred to removing step S155. As indicated by solid arrows in FIG. 10, the chromaticity change by removal of E' is restricted within the fourth quadrant (a>0 and b<0). B can be prevented from decreasing more than the hue restriction range in the removing step.

In removing step S155, a new intensity of the B plane is calculated by subtracting the removal amount E' from the intensity of the B plane:

$$B = B - E'$$

A color image whose B plane is corrected is transferred as an output from the color fringing removing unit 150 to the vision correction unit 160.

The first embodiment has described a color image capturing apparatus having the imaging optical system 110 to recording unit 180. It is also possible to constitute an image processing apparatus which performs only color fringing removal by arranging some or all units except for the color fringing removing unit 150 as separate devices. In this case, an image processing apparatus is arranged separately from a color image capturing apparatus. The image processing apparatus is configured to read (receive) a color image which is shot by the color image capturing apparatus and recorded on a recording medium such as a semiconductor memory or magnetic/optical disk.

The color image capturing system having the blue fringing removing unit according to the first embodiment can effectively remove blue fringing and obtain a natural shot image. The accessory imaging optical system can ease the restriction on longitudinal chromatic aberration in the B band. Other aberration corrections, downsizing, and cost reduction can be achieved on a higher level.

Second Embodiment

Figure 11:
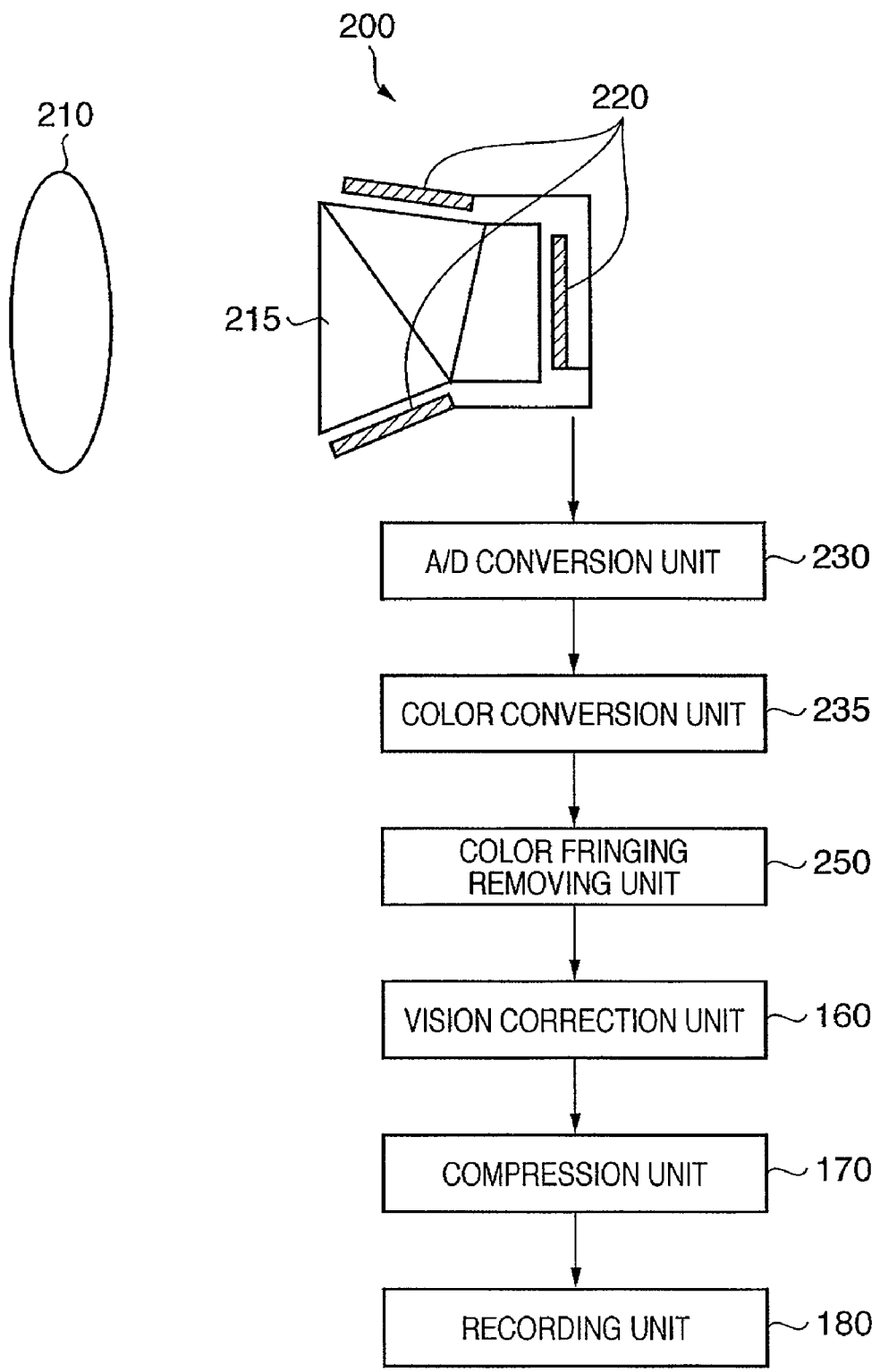
FIG. 11 is a view showing the arrangement of a color image capturing apparatus to which an image processing method according to the second embodiment is applicable.

FIG. 11 shows an example of a color image capturing apparatus 200 to which an image processing method according to the second embodiment of the present invention is applicable. In FIG. 11, the same reference numerals as those in FIG. 3 denote the same functional parts.

The color image capturing apparatus 200 comprises an imaging optical system 210, a color separation prism 215, image sensors 220, an A/D conversion unit 230, a color conversion unit 235, a color fringing removing unit 250, a vision correction unit 160, a compression unit 170, and a recording unit 180.

The image sensors 220 according to the second embodiment are three CCD image sensors, unlike the first embodiment. The color separation prism 215 is added for the image sensors 220, and the demosaicking unit 140 in the first embodiment is omitted.

In FIG. 11, rays traveling from an object are formed into images on the image sensors 220 via the imaging optical system 210 and color separation prism 215. In the color separation prism 215, the propagation direction of light changes depending on the wavelength of light. Thus, rays having different R (Red), G (Green), and B (Blue) wavelength ranges reach the different image sensors 220. For this reason, the image sensors 220 do not have any color filter, and obtain images corresponding to the R, G, and B color planes.

The imaging optical system 210 according to the second embodiment sufficiently corrects longitudinal chromatic aberration in only the wavelength range within the G band, and longitudinal chromatic aberration remains in the R and B bands. The three CCD image sensors can also correct longitudinal chromatic aberration by adjusting their horizontal positions. However, this adjustment is not considered in the second embodiment because it cannot cope with variations in aberration amount caused by the zoom position of the optical system or the like. As a result, the resolutions of the R and B planes are lower than that of the G plane. Red and blue blur at the boundary between bright and dark regions in a color image obtained by compositing the three planes. An artifact like a red, blue, or purple fringe appears around the bright region.

The A/D conversion unit 230 converts images of the R, G, and B color planes output as analog voltages from the three CCD image sensors 220 into digital data suited to subsequent image processing.

The color conversion unit 235 converts the color representation from RGB into YUV. The color conversion unit 235 uses matrix operation, obtaining the three, Y, U, and V planes:

$$\begin{pmatrix} Y \\ U \\ V \end{pmatrix} = \begin{pmatrix} 0.30 & 0.59 & 0.11 \\ -0.15 & -0.29 & 0.44 \\ 0.61 & -0.52 & 0.10 \end{pmatrix} \begin{pmatrix} R \\ G \\ B \end{pmatrix} \quad (2)$$

Y represents brightness, U represents blueness, and V represents redness.

The color fringing removing unit 250 removes the artifact from a color image by image processing. The image processing method according to the second embodiment is directed to this removing processing, which will be explained in detail later.

The vision correction unit 160, compression unit 170, and recording unit 180 are identical to those in the first embodiment.

Figure 12:
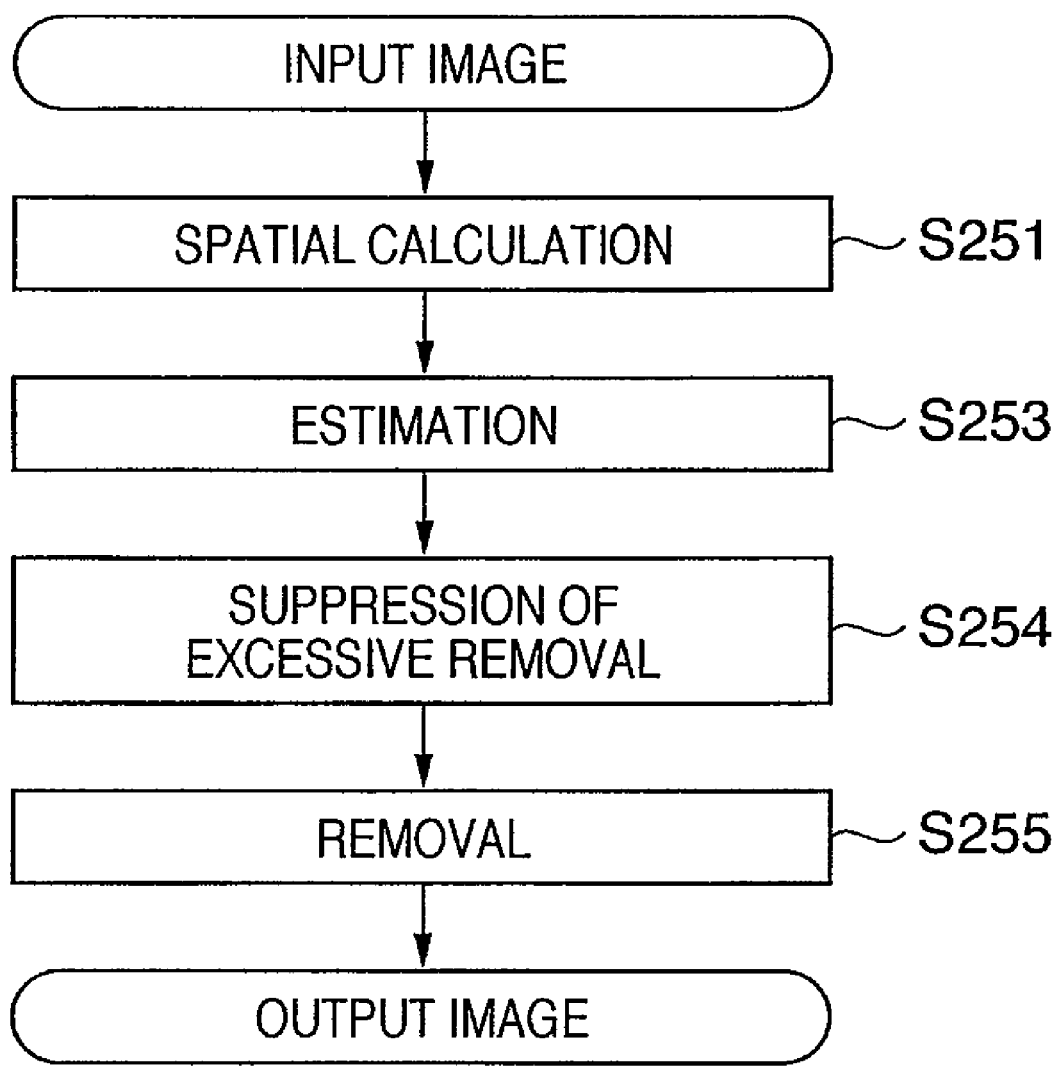
FIG. 12 is a flowchart showing a color fringing removing operation by image processing in the color image capturing apparatus according to the second embodiment.

FIG. 12 is a flowchart showing a color fringing removing operation by image processing in the color image capturing apparatus 200 having this arrangement.

As shown in FIG. 12, the process of the color fringing removing unit 250 includes a spatial calculation step S251, estimation step S253, excessive removal suppressing step S254, and removing step S255. The color fringing removing unit 250 sets the R and B planes as removal targets, and uses the Y plane as a reference plane.

Figure 13:
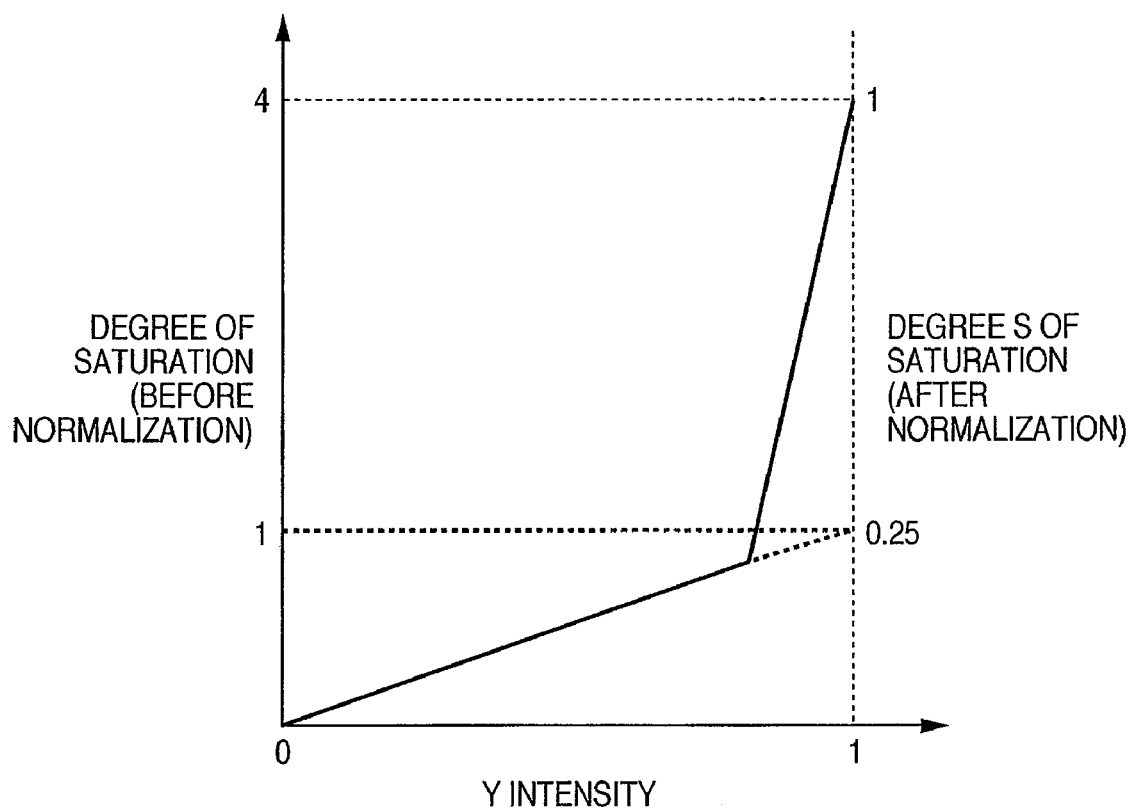
FIG. 13 is a graph showing a non-linear conversion characteristic.
Figure 14:
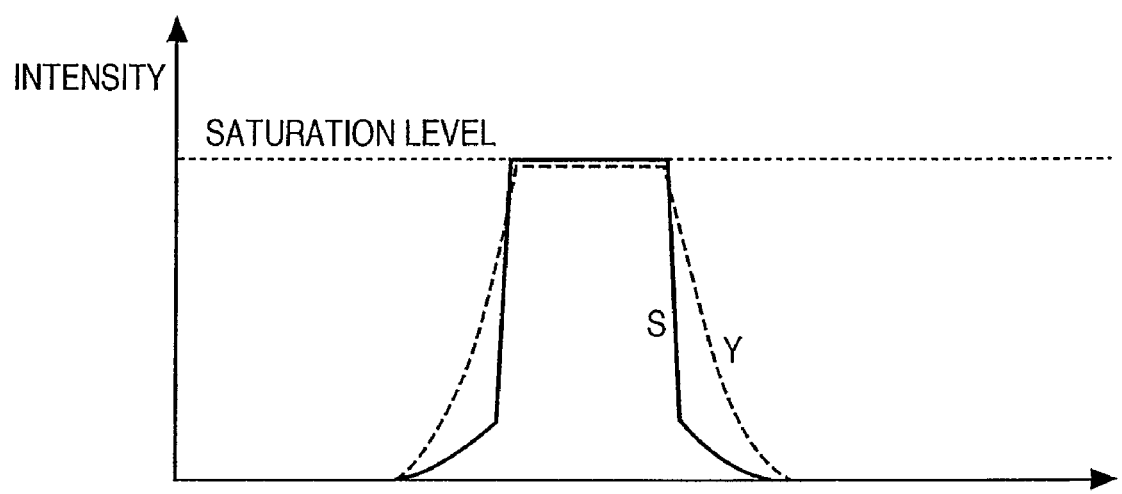
FIG. 14 is a graph showing a saturation degree profile.

In the spatial calculation step S251, a degree S of saturation of each pixel is calculated by executing non-linear conversion for the intensity of the Y plane, and convolution processing for the degree S of saturation is performed. The non-linear conversion corrects the brightness of a bright object that is represented excessively low owing to saturation. As a result of the conversion, as shown in FIG. 13, the Y intensity abruptly increases near a region where the Y intensity is saturated, and exhibits a larger value as compared with the proportional relationship between the Y intensity and the degree of saturation in the unsaturated region. In FIG. 13, the maximum value is 4. In the following description, the Y intensity is so normalized as to set the maximum value of the degree of saturation to 1. The degree S of saturation has a profile indicated by a solid line in FIG. 14, and the Y intensity has a profile indicated by a dotted line in FIG. 14. In FIG. 14 the abscissa axis represents pixel position and the ordinate axis represents intensity.

As a simple example of the non-linear conversion, the Y intensity after conversion may take one of two values, for example, 1 near the region where the Y intensity is saturated (e.g., Y>0.8), and 0 in the unsaturated region (Y<0.8).

Convolution processing is done for the degree S of saturation, obtaining convolution results $S_R$ and $S_B$. Since $S_R$ and $S_B$ can be considered as fringes in the B (Blue) and R (Red) bands, two corresponding convolution processes are executed:

$$S_R = k_R \otimes S$$

$$S_B = k_B \otimes S \quad (3)$$

Figure 15:
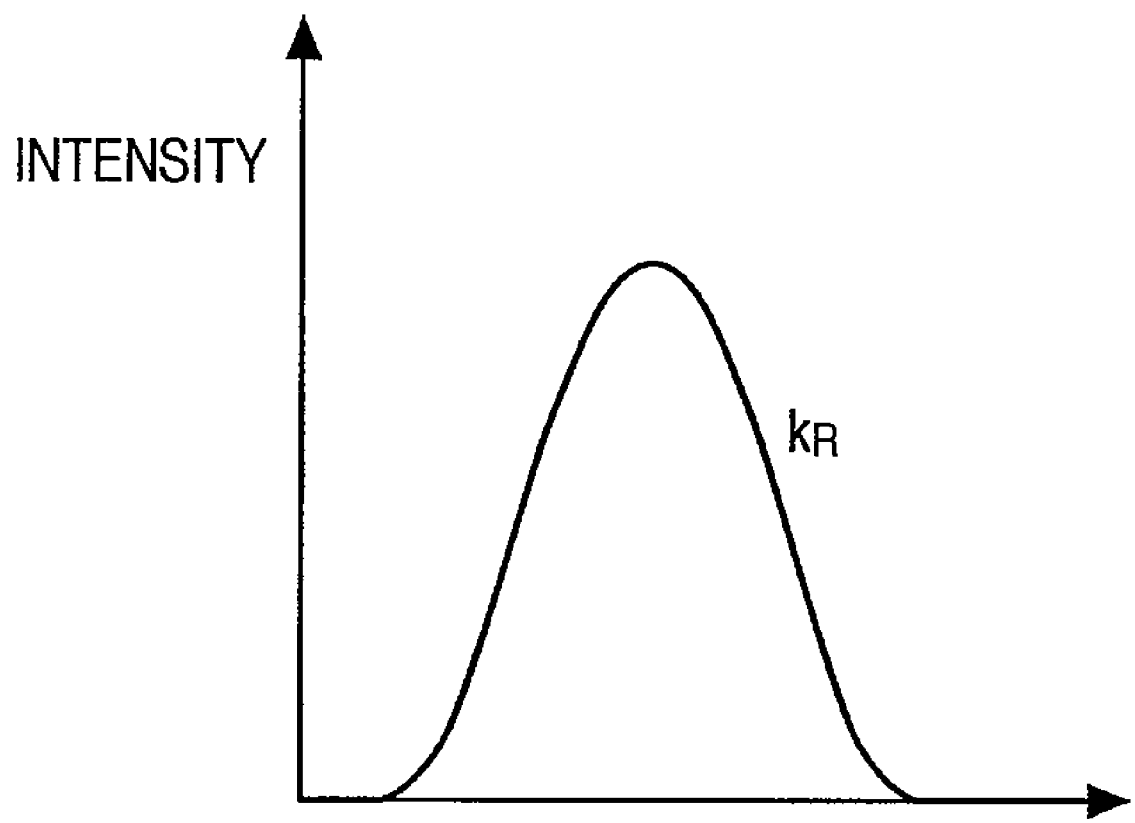
FIG. 15 is a graph showing a convolution kernel.

FIG. 15 shows an example of the convolution kernel $k_R$ and FIG. 16 shows an example of the convolution result $S_R$ for the degree S of saturation having the profile shown in FIG. 14. In FIGS. 15 and 16 the abscissa axis represents pixel position and the ordinate axis represents intensity.

The convolution kernels $k_R$ and $k_B$ simulate a decrease in the resolution of the imaging optical system 210, and can use, for example, the PSFs (Point-Spread Functions) of typical wavelengths in the R and B bands. An effective example of the typical wavelength in the B band is the mercury lamp emission line (405 nm) often present in night scenes. The characteristics of the PSF and imaging optical system change depending on the image location and lens states such as the zoom position, F-number, focus position, and lens interchange. The convolution kernels are desirably changed in accordance with these factors.

Alternatively, considering the presence of excessive removal suppressing step S254 to be described below, it is also possible to set a convolution kernel which envelops a plurality of changeable PSFs and estimates an excessively large fringing amount so as to cope with change in the characteristics of the imaging optical system. Convolution using different kernels depending on the image location puts a heavy calculation load. Hence, the calculation load can be effectively reduced using an axially symmetrical convolution kernel which envelops change of the PSFs in the image direction within the entire image plane or a predetermined region of the image plane. The calculation load can also be effectively reduced using a shift invariant convolution kernel which envelops even change depending on the image height. At this time, the convolution kernel may be an exponential function or Gaussian function.

Similarly, a convolution kernel which envelops a plurality of PSFs that change depending on the wavelengths in the R and B bands may also be set. Particularly in this case, the B band effectively includes the mercury lamp emission line (405 nm).

These convolution kernels desirably decrease in intensity as the distance from a center position increases.

In estimation step S253, estimated values EU and EV of the degree of color fringing in the U and V planes of the CIE LUV color space are generated. In this case, EU and EV are simply constant multiples of $S_R$ and $S_B$ respectively:

$$EU = 0.424 fB \cdot S_B$$

$$EV = 0.877 fR \cdot S_R$$

where fB and fR correspond to original image intensities in the saturated region in the B and R color planes respectively, and take a value of 1 to 10. For example, based on empirical studies fB and fR can be set to 4 to obtain satisfactory results.

In excessive removal suppressing step S254, the estimated amounts EU and EV are corrected to obtain actual removal amounts E' in the U and V planes. Attention is paid to the chromaticity coordinates, similar to the first embodiment.

Figure 17:
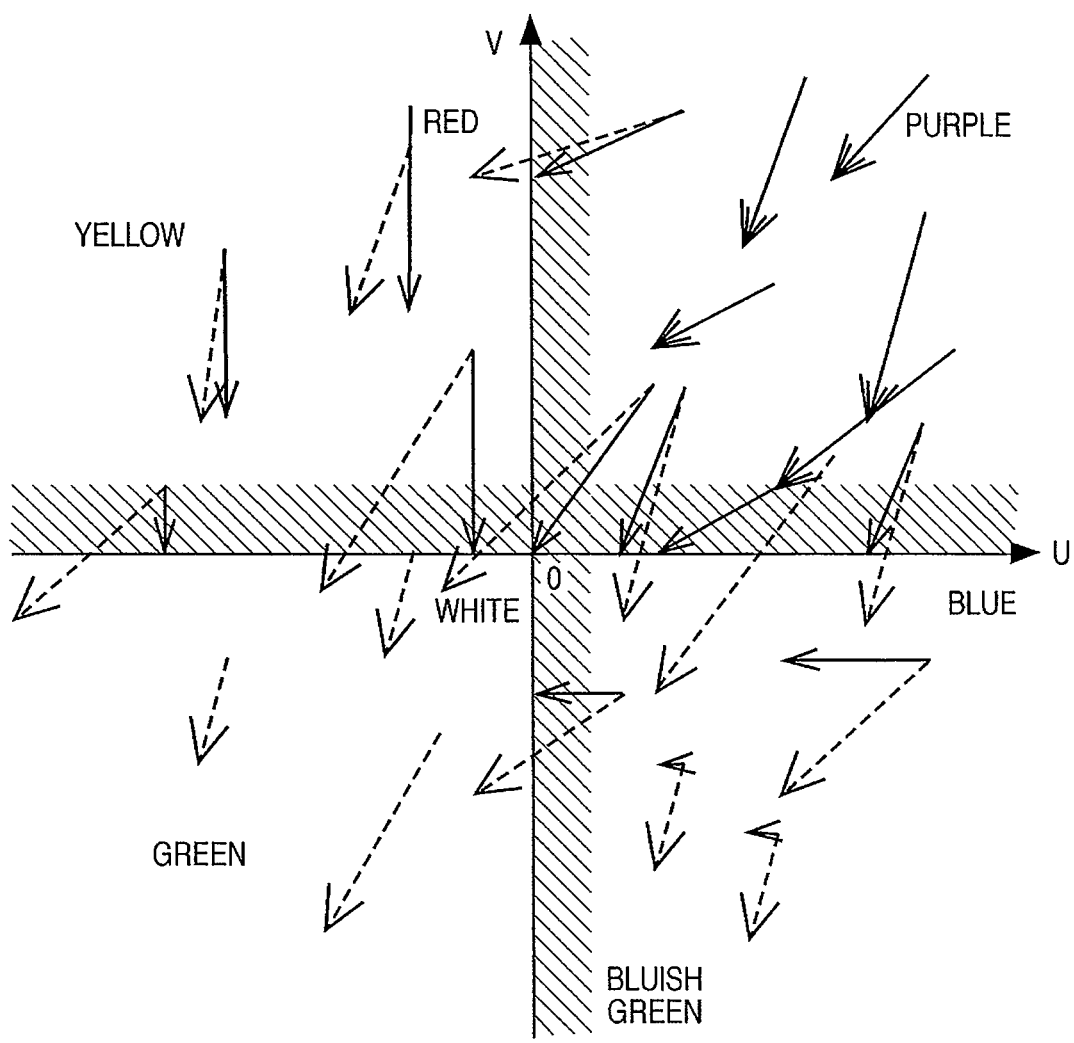
FIG. 17 is a graph showing the chromaticity coordinates of the U-V plane.

FIG. 17 shows the chromaticity coordinates of the U-V plane. Blue is U>0, and red is V>0. When EU and EV are removed from the U and V intensities (i.e. if step S254 is omitted), the chromaticity moves to the lower left as indicated by dotted arrows. The moving direction changes depending on the ratio of EU and EV. The start point of the arrow represents a chromaticity before removal, and its tip represents a chromaticity after removal of the estimated amounts EU and EV.

In this embodiment, step S254 restricts the hue restriction range to a range defined by U>0 and V>0 (i.e. the first, second and fourth quadrants but not the third quadrant). EU'=0 for pixels having U≦0, and EV'=0 for pixels having V≦0. For pixels having U>0, $$EU' = \min(EU, U)$$

For pixels having V>0, $$EV' = \min(EV, V)$$

Then, EU' and EV' are transferred to removing step S255. As indicated by solid arrows in FIG. 17, the chromaticity change by removal of EU' and EV' is restricted within the corresponding quadrants. Further, only V changes in the second quadrant, only U changes in the fourth quadrant, and neither of them changes in the third quadrant. In terms of changes to R and B, this means that the R and B intensities do not lower from the luminance Y, and R and B intensities originally lower than Y do not change. Referring to FIG. 17, in the first quadrant, the solid arrows (representing the actual changes) coincide with the dotted arrows in some cases but not others. The cases where they coincide are the ones which remain in the first quadrant after the change. In the remaining cases, the dotted arrow ends outside the first quadrant. In this case, for dotted arrows which end in the fourth quadrant, the change is restricted so that V=0 and U for the head of the solid arrow is the same as for the dotted arrow. For dotted arrows which end in the second quadrant, the change is restricted so that U=0 and V for the head of the solid arrow is the same as for the dotted arrow. For dotted arrows which end in the third quadrant, the change is restricted so that U and V for the head of the solid arrow are both 0. In the second quadrant, no change to U is permitted, so the solid arrows all extend vertically. V for the head of each solid arrow is the same as for the corresponding dotted arrow, unless the dotted arrow ends outside the second quadrant (V<0), in which case V is set to 0. In the third quadrant, no changes at all are permitted, so no solid lines are shown in FIG. 17. In the fourth quadrant, no change to V is permitted, so the solid arrows all extend horizontally. U for the head of each solid arrow is the same as for the corresponding dotted arrow, unless the dotted arrow ends outside the fourth quadrant (U<0), in which case U is set to 0.

In removing step S255, new U and V plane values are calculated by subtracting the removal amounts EU' and EV' from the U and V plane values:

$$U = U - EU'$$

$$V = V - EV'$$

A color image whose U and V planes are corrected is transferred as an output from the color fringing removing unit 250 to the vision correction unit 160.

In the second embodiment, the fringes of the B and R planes are mixed in the Y plane. The amount of white fringing is slightly larger than that in a case where the G plane is used as a reference plane. However, the cost of the processing apparatus can be suppressed by executing main calculation on the U and V planes which do not require high precision. The optical system in the second embodiment needs to have high resolution in only the G band, and the restriction on chromatic aberration in the R and B bands can be eased.

Third Embodiment

Figure 18:
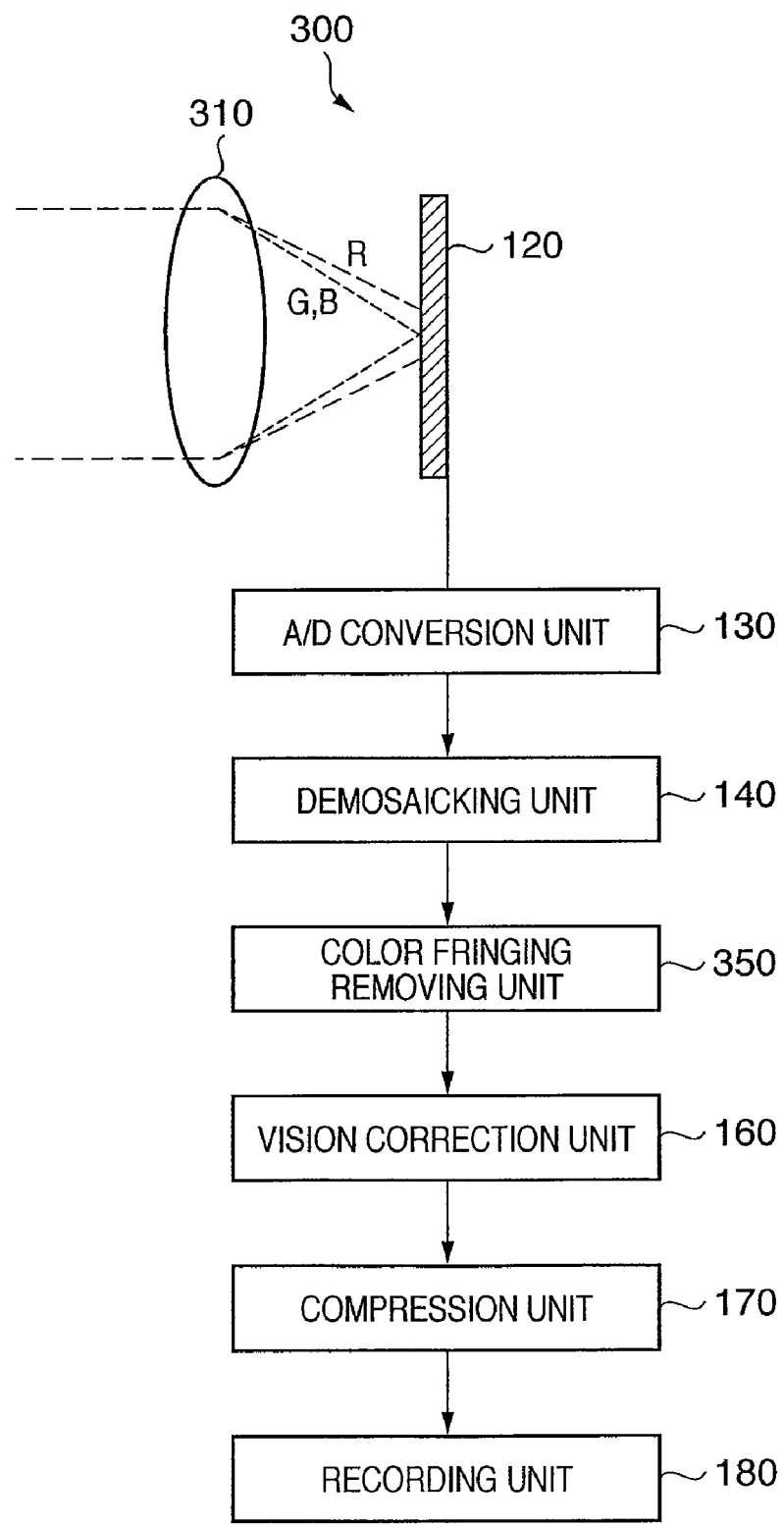
FIG. 18 is a view showing the arrangement of a color image capturing apparatus to which an image processing method according to the third embodiment is applicable.

FIG. 18 shows an example of a color image capturing apparatus 300 to which an image processing method according to the third embodiment of the present invention is applicable. In FIG. 18, the same reference numerals as those in FIG. 3 denote the same functional parts.

The color image capturing apparatus 300 comprises an imaging optical system 310, image sensor 120, A/D conversion unit 130, demosaicking unit 140, color fringing removing unit 350, vision correction unit 160, compression unit 170, and recording unit 180.

The imaging optical system 310 according to the third embodiment forms light traveling from an object into an image on the image sensor 120. Longitudinal chromatic aberration is sufficiently corrected by the imaging optical system 310 in the wavelength range of the G and B bands, but remains in the R band.

The following phenomenon occurs on the R, G, and B planes of a color image which is formed on the imaging optical system 310 and generated via the image sensor 120, A/D conversion unit 130, and demosaicking unit 140. That is, the resolution of the R plane is lower than those of the G and B planes under the influence of chromatic aberration of the imaging optical system 310. Red blurs at the boundary between bright and dark regions in a color image obtained by compositing the three planes. An artifact like a red fringe appears around the bright region.

The color fringing removing unit 350 removes the red artifact from a color image by image processing. The image processing method according to the third embodiment concerns this removing processing, which will be explained in detail later.

The image sensor 120, A/D conversion unit 130, demosaicking unit 140, vision correction unit 160, compression unit 170, and recording unit 180 are identical to those in the first embodiment.

Figure 19:
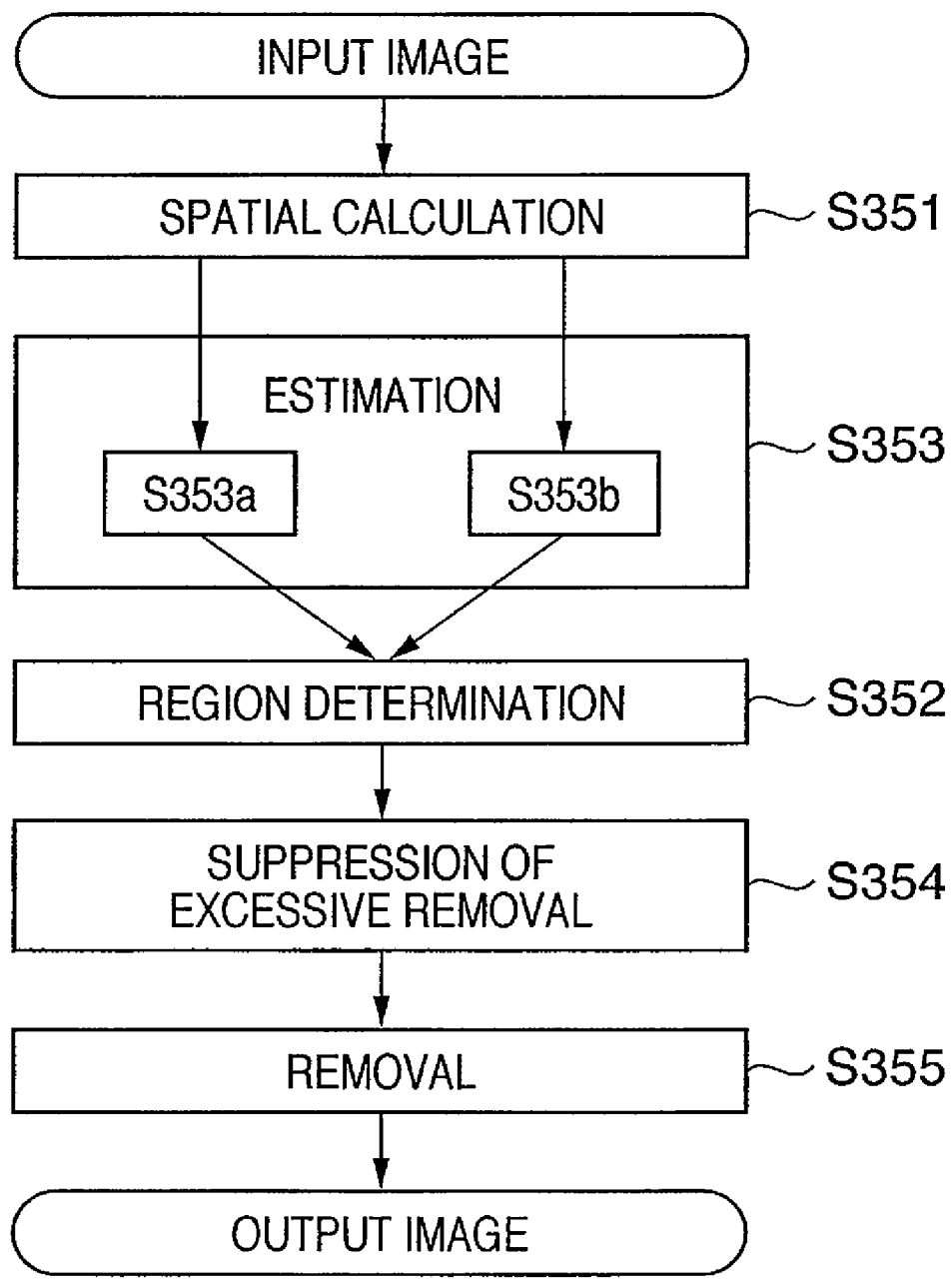
FIG. 19 is a flowchart showing a color fringing removing operation by image processing in the color image capturing apparatus according to the third embodiment.

FIG. 19 is a flowchart showing a color fringing removing operation by image processing in the color image capturing apparatus 300 having this arrangement.

As shown in FIG. 19, the process of the color fringing removing unit 350 includes spatial calculation step S351, estimation step S353, region determination step S352, excessive removal suppressing step S354, and removing step S355.

The color fringing removing unit 350 sets the R plane as a removal target, and uses the G plane as a reference plane.

In spatial calculation step S351, intensity gradient maps Rlea and Glea for the R and G planes are generated by considering each pixel in turn.

For each considered pixel in the R plane at location (x,y) a gradient vector Rlea is calculated based on the intensity values of neighbouring pixels in the R plane.

Similarly, for the same considered pixel in the G plane (i.e. the pixel at location (x,y) or the location closest thereto in the G plane) a gradient vector Glea is calculated based on the intensity values of neighbouring pixels in the G plane.

For example, $$Rlea = \left(\frac{dR}{dx}, \frac{dR}{dy}\right) \quad (4)$$

$$\equiv \left( \frac{R(x+1,y) - R(x-1,y)}{2}, \frac{R(x,y+1) - R(x,y-1)}{2} \right)$$

$$Glea = \left( \frac{dG}{dx}, \frac{dG}{dy} \right)$$

$$\equiv \left( \frac{G(x+1,y) - G(x-1,y)}{2}, \frac{G(x,y+1) - G(x,y-1)}{2} \right)$$

where R(x+1,y) and G(x+1,y) are the intensity values of pixels on the right side of the considered pixels in the R and G planes, R(x−1,y) and G(x−1,y) are the intensity values of pixels on the left side of the considered pixels in the R and G planes, R(x,y+1) and G(x,y+1) are the intensity values of pixels immediately below the considered pixels in the R and G planes, and R(x,y−1) and G(x,y−1) are the pixel values of pixels immediately above the considered pixels in the R and G planes.

In the estimation step S353, an estimated value of the degree of color fringing in the R plane is generated for each pixel of the color image. The estimation method changes depending on whether the pixel intensity value R is saturated. Considering the two cases where R is saturated and is not saturated, two estimated amounts E1 and E2 are calculated in S353a and S353b.

Figure 20:
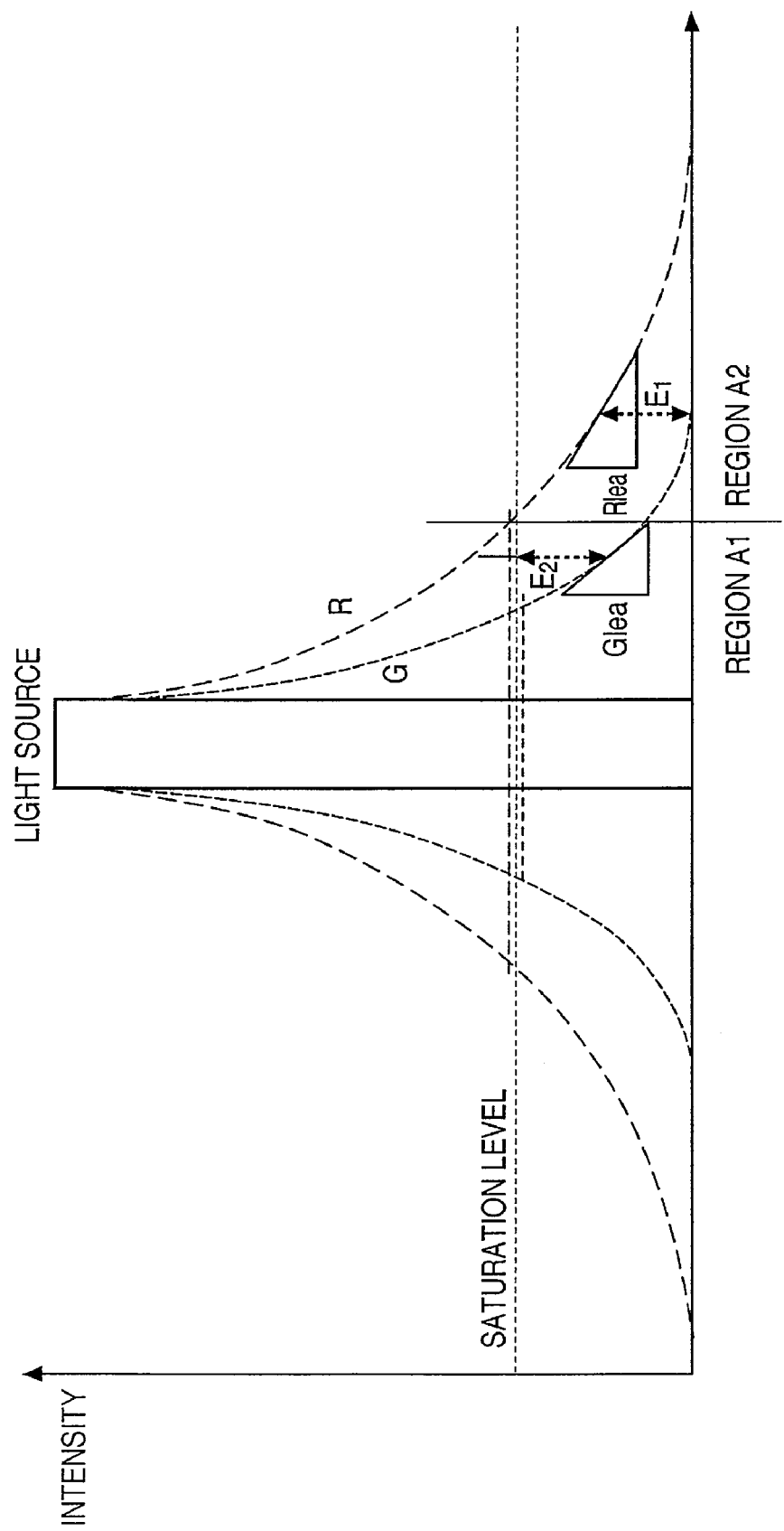
FIG. 20 is a graph showing the typical intensity profile of red fringing.

FIG. 20 shows the typical intensity profile of red fringing.

In FIG. 20, the abscissa axis represents a section on an image (pixel position), and the ordinate axis represents the intensities of the R and G planes. In FIG. 20, a bright object exceeding the saturation brightness exists at the center. The bottom of the profile exponentially spreads at the periphery, which is not bright originally, of the light source by light leaking from the light source owing to aberration or flare. Even the G plane suffers fringing, and its profile spreads to a certain degree though the spread is smaller than that of the R plane. An intensity at a predetermined saturation level or higher cannot be measured by the image sensor, and is rounded down. If the R intensity exceeds the G intensity in these profiles, red fringing occurs.

From this, the third embodiment estimates the R fringing amount from the gradient of the R brightness profile. In S353a, a first estimated fringing amount E1 is calculated by multiplying the absolute value of the R gradient vector Rlea by a coefficient k1:

$$E1 = k1|Rlea|$$

where k1 is a positive value and is preferably around 3.

However, the brightness gradient is 0 in the region A1 where R is saturated, and a brightness gradient before saturation cannot be obtained. In S353b, therefore, a second estimated fringing amount E2 is calculated for this region A1. In S353b, the estimated fringing amount E2 is determined from the G gradient Glea:

$$E2 = k2|Glea|$$

where k2 is a positive value and is preferably around 3.

Figure 21:
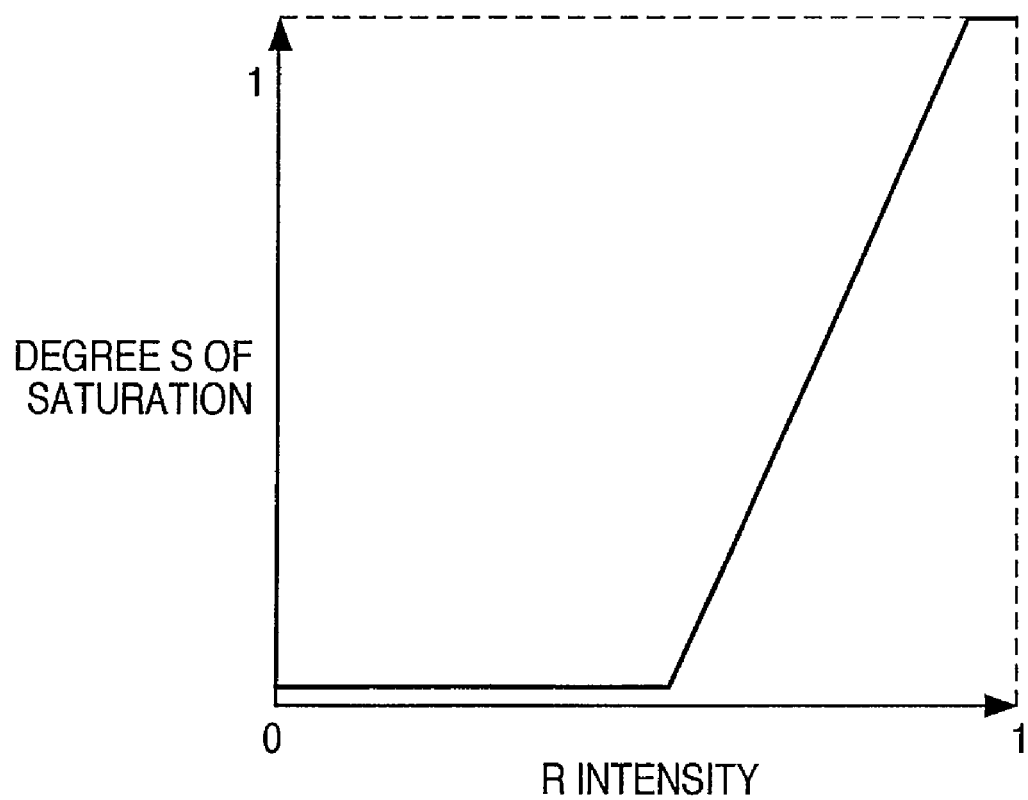
FIG. 21 is a graph showing a non-linear conversion characteristic.

In region determination step S352, the degree S of saturation is calculated by executing non-linear conversion for the intensity of the R plane. The non-linear conversion represents whether R is saturated. The degree S of saturation is 1 in a region where the R intensity is saturated and 0 in a region where the R intensity is not saturated. S may take one of the two values 0 and 1, or alternatively S may take a value which continuously changes from 0 to 1, as shown in FIG. 21. One or the other of the first an second estimated values E1 and E2 calculated in S353 is selected in accordance with the degree S of saturation. In the case in which S takes one of the two values 0 and 1, a new estimated amount E is set to $$E = E1 \text{ (for } S=0\text{)}$$

$$E = E2 \text{ (for } S=1\text{)}$$

In the alternative case in which S takes a value which continuously changes from 0 to 1, the new estimated amount E is set to $$E = (1-S)E1 + S \cdot E2$$

Figure 22:
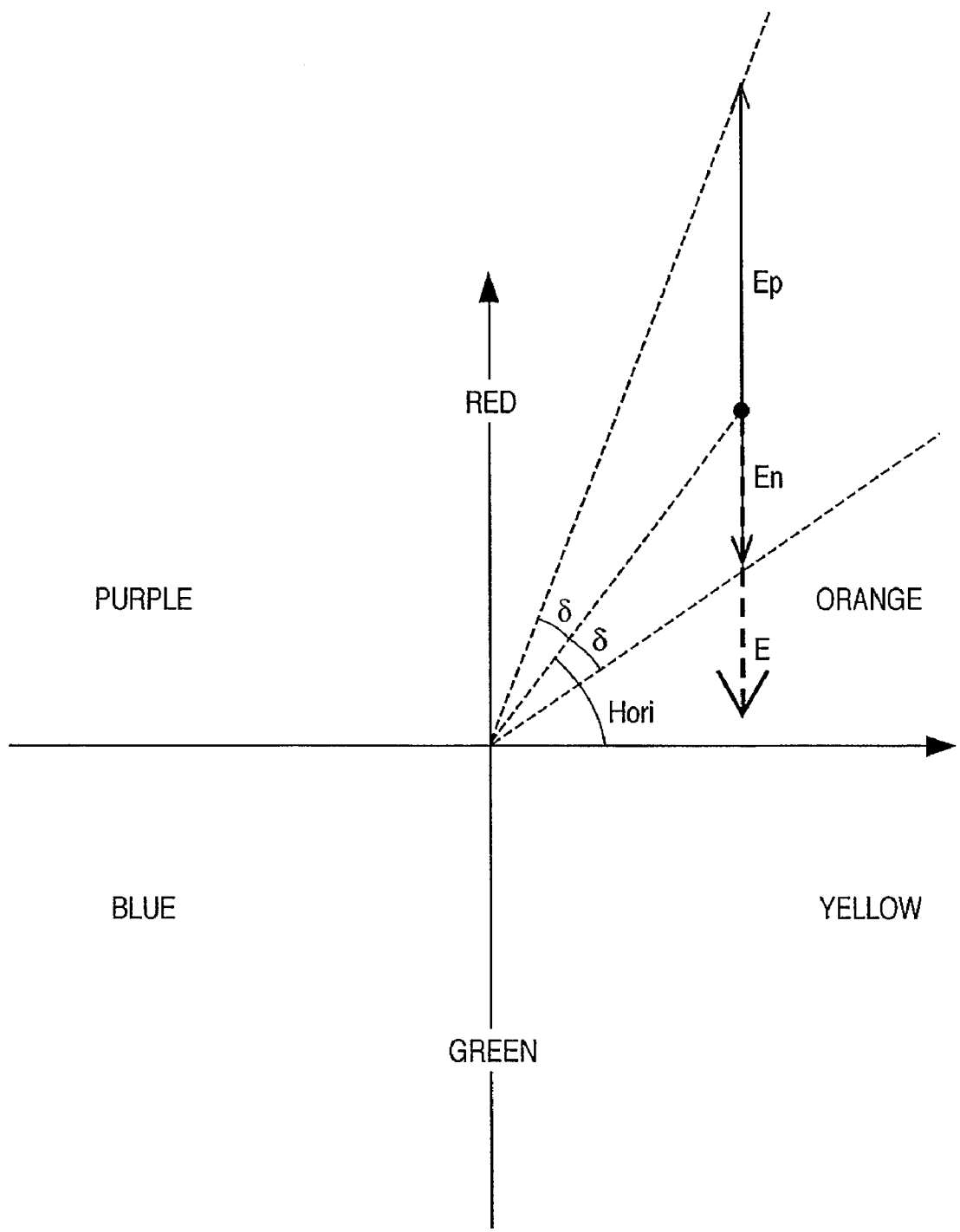
FIG. 22 is a graph showing an excessive removal suppressing principle.

In excessive removal suppressing step S354, the estimated amount E is corrected to obtain an actual removal amount E' for the R plane. In this step, change of the hue H upon removal is limited within a predetermined angle δ in this embodiment. The hue-chroma plane is as shown in FIG. 22. When the estimated amount E is removed from the R intensity, the hue-chroma plane moves down as indicated by dotted arrows. To limit change of the hue within a predetermined angle δ, a an original hue Hori before removal is obtained first:

$$Hori = H(R,G,B)$$

Then, negative and positive R removal amounts En and Ep for changing the hue angle negatively (clockwise in FIG. 22) and positively (anticlockwise) by the predetermined angle δ are calculated such that H(R−En, G, B)=Hori−δ

$$H(R-Ep,G,B) = Hori + \delta$$

δ is preferably set to about 10° to 45°.

From En, Ep, and region determination step S352, the removal amount E' is set to $$E' = \min(E, \max(En, Ep, 0))$$

Then, E' is transferred to removing step S355.

In FIG. 22, E'=En.

In removing step S355, a new intensity of the R plane is calculated by subtracting the removal amount E' from the intensity of the R plane:

$$R = R - E'$$

A color image whose R plane is corrected is transferred as an output from the color fringing removing unit 350 to the vision correction unit 160.

In the third embodiment, only upper, lower, right, and left pixels adjacent to a pixel subjected to removal are referred to in color fringing removal. Thus, no large-capacity frame memory is necessary, and a buffer memory for two lines suffices to process the entire image by raster scanning. An image processing apparatus can be implemented as a high-speed, compact circuit.

As described above, the third embodiment can effectively remove color fringing by image processing.

However, if fringing is completely removed, the brightness and color of a bright object exceeding the saturation brightness cannot be identified. To prevent this, the above-described embodiments set a reference plane to reduce conspicuous fringing of a color plane to the same level as that of the reference plane. The embodiments do not aim to reduce fringing much more. Even an image having undergone color fringing removing processing has a certain degree of fringing, and allows identifying the brightness and color of a bright object.

Because of the image processing provided by embodiments of the present invention, it is sufficient for the imaging optical system that is used to capture the color image capturing apparatus to remove aberration in at least one color band.

Other aberration corrections, downsizing, and cost reduction demanded of the imaging optical system can be achieved on a higher level.

Other Embodiments

An embodiment of the present invention can also be implemented using software. Accordingly, a further aspect of the present invention can provide a program which, when run on a computer or processor, causes the computer or processor to execute an image processing method according to any of the preceding embodiment. Such a program can be provided by itself or can be carried in or on a carrier medium. The carrier medium may be a transmission medium, for example a signal such as a download signal transmitted via a network. The carrier medium may also be a storage medium such as a disk or memory stick. For example, a storage medium (or recording medium) which stores software program codes for implementing the functions of the above-described embodiments may be supplied to the system or apparatus. The computer (or processor such as a CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case where the functions of the above-described embodiments are implemented when the computer executes the readout program codes, the present invention incorporates the following case. That is, the functions of the above-described embodiments are implemented when the operating system (OS) or the like running on the computer performs part or all of actual processing based on the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing based on the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-332610 and 2006-332611 both filed Dec. 8, 2006, which are hereby incorporated by reference herein in their entirety.

What is claimed is:

1. An image processing apparatus, for processing original image data representing a captured color image that has been subjected to photoelectric conversion, comprising:

estimation unit which generates estimated color fringing information representing an estimate of color fringing in the captured image on the basis of the original image data;

removing unit which employs the estimated color fringing information to generate modified image data based on the original image data so as to compensate for such color fringing in at least a part of the captured image;

a spatial calculation unit which uses, as a reference plane, a color plane other than a color plane from which said removing unit removes color fringing, and calculates a gradient of a signal intensity of a color plane; and a region determination unit which determines whether the color plane from which said removing unit removes color fringing is saturated, wherein said estimation unit selects either of a gradient of a signal intensity of the color plane subjected to removal and a gradient of a signal intensity of the reference plane on the basis of a determination result of said region determination unit and estimates the degree of color fringing in each region of the color image by using the selected gradient.

* * * * *